United States Patent
Hatanaka

(10) Patent No.: US 12,304,574 B1
(45) Date of Patent: May 20, 2025

(54) ROTATION LIMITING DEVICE, AND STEERING DEVICE

(71) Applicant: NSK STEERING & CONTROL, INC., Tokyo (JP)

(72) Inventor: Kazuyuki Hatanaka, Gunma (JP)

(73) Assignee: NSK STEERING & CONTROL, INC., Tokyo (JP)

( * ) Notice: Subject to any disclaimer, the term of this patent is extended or adjusted under 35 U.S.C. 154(b) by 0 days.

(21) Appl. No.: 18/838,472

(22) PCT Filed: Dec. 20, 2022

(86) PCT No.: PCT/JP2022/046983
§ 371 (c)(1),
(2) Date: Aug. 14, 2024

(87) PCT Pub. No.: WO2023/157462
PCT Pub. Date: Aug. 24, 2023

(30) Foreign Application Priority Data

Feb. 15, 2022 (JP) .................. 2022-021008

(51) Int. Cl.
   *B62D 5/00* (2006.01)
   *B62D 1/16* (2006.01)
(52) U.S. Cl.
   CPC ............ *B62D 5/001* (2013.01); *B62D 1/16* (2013.01)
(58) Field of Classification Search
   CPC .................. B62D 5/001; B62D 1/16
   See application file for complete search history.

(56) References Cited

U.S. PATENT DOCUMENTS 8,813,901 B2 * 8/2014 Tashiro ............... B62D 5/001
                                                  180/402
10,239,552 B2 * 3/2019 Bodtker ............... B62D 5/001
(Continued)

FOREIGN PATENT DOCUMENTS

FR         2 809 522 A1    11/2001
JP         5-42437 A        2/1993
(Continued)

OTHER PUBLICATIONS

International Search Report (PCT/ISA/210) issued on Jan. 31, 2023 by the International Searching Authority in International Application No. PCT/JP2022/046983.
(Continued)

*Primary Examiner* — Faye M Fleming
(74) *Attorney, Agent, or Firm* — Sughrue Mion, PLLC

(57) ABSTRACT

A rotation limiting device includes: a first member having a first protrusion; a second member having a second protrusion disposed on an axial one side with respect to the first protrusion, the second member being disposed around the first member and configured to rotate relative to the first member; at least one intermediate member, disposed between the first member and the second member in a radial direction and supported in a relatively rotatable manner with respect to the first and the second members, including a side plate portion, an intermediate side first protrusion protruding from an axial other side surface of the side plate portion, and an intermediate side second protrusion protruding from an axial one side surface of the side plate portion; and a rotation support mechanism configured to support the second member around the first member in a relatively rotatable manner with respect to the first member.

4 Claims, 14 Drawing Sheets

(56) References Cited

U.S. PATENT DOCUMENTS

| | | | |
|---|---|---|---|
| 11,745,788 B2 * | 9/2023 | Shin ................. | B62D 5/001 |
| | | | 180/402 |
| 11,801,886 B2 * | 10/2023 | Büker ................ | B62D 5/001 |
| 2018/0238377 A1 | 8/2018 | Kim et al. | |
| 2020/0130725 A1 | 4/2020 | Ishimura et al. | |
| 2022/0266895 A1 | 8/2022 | Ku et al. | |
| 2024/0425103 A1 * | 12/2024 | Büker ................ | B62D 5/001 |

FOREIGN PATENT DOCUMENTS

| | | |
|---|---|---|
| JP | 2000-16316 A | 1/2000 |
| JP | 2006-182078 A | 7/2006 |
| JP | 2012-91677 A | 5/2012 |
| JP | 2020-69844 A | 5/2020 |
| JP | 2021-172231 A | 11/2021 |

OTHER PUBLICATIONS

Written Opinion (PCT/ISA/237) issued on Jan. 31, 2023 by the International Searching Authority in International Application No. PCT/JP2022/046983.

\* cited by examiner

ROTATION LIMITING DEVICE, AND STEERING DEVICE

CROSS-REFERENCE TO RELATED APPLICATIONS

This application is a National Phase Entry of PCT International Application No. PCT/JP2022/046983 filed on Dec. 20, 2022, which claims priority to Japanese Patent Application No. 2022-021008 filed on Feb. 15, 2022, the contents of all of which are incorporated herein by reference in their entirety.

TECHNICAL FIELD

The present disclosure relates to a rotation limiting device for limiting a rotatable amount of a rotation member, and a steering device.

BACKGROUND ART

In a rack-and-pinion type steering device, when a steering wheel is operated (turned) to the maximum limit to the right or left, a rack end, which is supported and fixed to an end portion of a rack shaft collides with a housing. As described above, in the rack-and-pinion type steering device in which a steering unit and a steered unit are mechanically connected, by limiting the stroke of a rack shaft constituting the steered unit, the number of lock-to-lock turns of the steering wheel (the number of turns of the steering wheel when the steering wheel is operated from fully right or left to fully left or right) is limited.

On the other hand, in a steer-by-wire type steering device, the steering unit and the steered unit are not mechanically connected. Therefore, the number of lock-to-lock turns of the steering wheel constituting the steering unit cannot be limited by limiting the stroke of the rack shaft constituting the steered unit.

FIG. 14 shows a stopper unit 100 for mechanically limiting the number of lock-to-lock turns of a steering wheel in a steer-by-wire type steering device described in Patent Literature 1. FIG. 14 shows FIG. 4 of JP2020-69844A with the left and right reversed (left and right symmetric). The stopper unit 100 includes a first rotation member 101, a housing 102, and a second rotation member 103.

The first rotation member 101 has a first rotation protrusion 104 protruding toward an axial one side on an axial one side surface (left side surface in FIG. 14). The first rotation member 101 is coupled and fixed to a tip end portion (end portion on an axial other side) of a steering shaft (not shown) in a manner of not be rotatable relative to the tip end portion. That is, the first rotation member 101 rotates integrally with the steering shaft in response to operation of the steering wheel.

The housing 102 has a fixing protrusion 105 protruding toward an axial other side on an axial other side surface (right side surface in FIG. 14), and does not rotate even during use. The steering shaft is supported on a radially inner side of the housing 102 so as to be rotatable relative to the housing 102.

The second rotation member 103 includes a cylindrical portion 106 and a second rotation protrusion 107 protruding toward a radially outer side from a position in a circumferential direction of an outer peripheral surface of the cylindrical portion 106. The second rotation member 103 is supported around the steering shaft so as to be rotatable relative to the steering shaft, the first rotation member 101, and the housing 102.

That is, the steering shaft is inserted through the housing 102 and the second rotation member 103 from the axial one side toward the axial other side, and the first rotation member 101 is coupled and fixed to the tip end portion of the steering shaft that protrudes from an end surface on the axial other side of the second rotation member 103. The steering wheel is supported and fixed to an end portion on the axial one side of the steering shaft.

In the steering device including the stopper unit 100, for example, when the steering wheel is operated to the right (turned in a clockwise direction as viewed from the left side in FIG. 14), first, the first rotation member 101 rotates together with the steering shaft from an upper side toward a lower side in FIG. 14. Then, a circumferential one side surface (a lower side surface in FIG. 14) of the first rotation protrusion 104 collides with a circumferential other side surface (an upper side surface in FIG. 14) of an axial other side portion of the second rotation protrusion 107.

When the steering wheel is further turned to the right from this state, the second rotation member 103 rotates together with the steering shaft and the first rotation member 101 from the upper side toward the lower side in FIG. 14. Then, a circumferential one side surface of an axial one side portion of the second rotation protrusion 107 comes into contact with a circumferential other side surface of the fixing protrusion 105. Thus, the steering wheel is restricted from being operated further to the left.

Patent Literature 2 discloses a small and lightweight multi-rotation limit mechanism that aims to detect a rotation limit operation with high accuracy without using a reduction gear mechanism. The multi-rotation limit mechanism includes: a rotation shaft rotatably provided on a bearing plate and having a rotation stopper fixed thereto; a plurality of idle rotors that are loosely fitted to the rotation shaft to receive rotation from the rotation stopper; a stopper rotor which is loosely fitted to the rotation shaft and to be engaged with the idle rotors; a pair of spring members which bias a stopper portion of the stopper rotor in both rotation directions; an electric sensor for detecting the stopper portion; and engaging pieces provided on the rotation stopper, the idle rotor, and the stopper rotor and to be engaged with each other.

Patent Literature 3 discloses a steering device that aims to keep constant a position of a striking sound generated when an operating member is rotated from a neutral position to the left or right. The steering device rotatably holds the operating member that is not mechanically connected to a steered wheel. The steering device includes: a shaft member that rotates in response to an operation of an operating member; a holding member that rotatably holds the shaft member; a rotation engagement member that is attached to the shaft member and includes a rotation claw that rotates integrally with the shaft member; a fixed claw that is disposed at a position not engaged with the rotation claw and is fixed to the holding member; an intermediate engaging member that rotates about an axis of the shaft member by engaging with the rotation engagement member and includes an intermediate claw that engages with the rotation claw and the fixed claw in a circumferential direction; and a biasing member that applies a biasing force to maintain the intermediate claw at a predetermined position in the circumferential direction with respect to the fixed claw in a state not engaged with the rotation claw.

Patent Literature 4 discloses a steer-by-wire type power steering device. The power steering device is provided with a rotation restriction mechanism that restricts a steering angle range of a steering wheel. The rotation restriction mechanism includes an integrated rotation portion that rotates integrally with a second input shaft, a relative rotation portion that rotates relative to the integrated rotation portion, and a stopper mechanism that restricts rotation of the relative rotation portion.

Patent Literature 5 discloses a steer-by-wire type steering device. The steering device includes: a first rotation member that is coupled to a steering shaft and rotates in conjunction with the steering shaft; a second rotation member that is supported on an outer periphery of the first rotation member and rotates in conjunction with the first rotation member when the steering shaft rotates; and a housing that houses the first rotation member and the second rotation member therein, is coupled to a steering column, and restricts rotation of the second rotation member by supporting an outer peripheral surface of the second rotation member on an inner peripheral surface.

CITATION LIST

Patent Literature

Patent Literature 1: JP2020-69844A
Patent Literature 2: JPH05-042437A
Patent Literature 3: JP2021-172231A
Patent Literature 4: JP2006-182078A
Patent Literature 5: US20220266895

SUMMARY OF INVENTION

Technical Problem

In the stopper unit 100 described in Patent Literature 1, the first rotation member 101 and the second rotation member 103 are rotatably supported around the steering shaft, and the first rotation member 101, the housing 102, and the second rotation member 103 are separated from each other in a state before the steering shaft is rotatably supported radially inside the housing 102. Therefore, the component management and assembly work are complicated.

The multi-rotation limit mechanism of Patent Literature 2 is a device for detecting a rotational end of a rotation shaft, and does not lock the rotation of the rotation shaft.

Similarly to Patent Literature 1, in the steering device of Patent Literature 3, since the holding member, the rotation engagement member, and the intermediate engaging member are separated from each other before being supported by the steering shaft, the component management and the assembly work are complicated.

Similarly, in the power steering device of Patent Literature 4, since the integrated rotation portion, the relative rotation portion, and the stopper mechanism are also separated from each other before being supported by the steering shaft, the component management and the assembly work are complicated.

Similarly, in the steering device of Patent Literature 5, since the first rotation member, the second rotation member, and the housing are also separated from each other before being supported by the steering shaft, the component management and the assembly work are complicated.

In view of the above-described circumstances, an object of the present disclosure is to provide a rotation limiting device that can be preassembled and assembled before being attached between a rotation member and a fixed portion.

Solution to Problem

A rotation limiting device according to an aspect of the present disclosure includes a first member, a second member, at least one intermediate member, and a rotation support mechanism.

The first member has a first protrusion.

The second member has a second protrusion disposed on an axial one side with respect to the first protrusion. The second member is disposed around the first member and configured to rotate relative to the first member.

The at least one intermediate member includes a side plate portion disposed between the first protrusion and the second protrusion in an axial direction, an intermediate side first protrusion protruding toward an axial other side from an axial other side surface of the side plate portion, and an intermediate side second protrusion protruding toward the axial one side from an axial one side surface of the side plate portion. The at least one intermediate member is disposed between the first member and the second member in a radial direction and is supported in a relatively rotatable manner with respect to the first member and the second member.

The rotation support mechanism is configured to support the second member around the first member in a relatively rotatable manner with respect to the first member.

In the rotation limiting device according to an aspect of the present disclosure, the first member may have a first side surface facing the axial one side and the first protrusion protruding from the first side surface toward the axial one side, and the second member may have a second side surface facing the axial other side and the second protrusion protruding from the second side surface toward the axial other side.

In the rotation limiting device according to an aspect of the present disclosure, the second member may include a second cylindrical portion and a second flange portion protruding radially inward from an inner peripheral surface of the second cylindrical portion, and the second flange portion may have the second side surface on an axial other side surface.

In the rotation limiting device according to an aspect of the present disclosure, the first member may include a first cylindrical portion to which the at least one intermediate member is externally fitted in a relatively rotatable manner and a first flange portion that protrudes toward a radially outer side from an outer peripheral surface of the first cylindrical portion, and the first flange portion may have the first side surface on an axial one side surface.

In the rotation limiting device according to an aspect of the present disclosure, the rotation support mechanism may include a radial rolling bearing having an inner ring externally fitted to the first member, an outer ring fitted into the second member, and a plurality of rolling elements rollably disposed between the inner ring and the outer ring.

A steering device according to an aspect of the present disclosure includes: a steering shaft; and a rotation limiting device configured to limit a rotatable amount of the steering shaft to a predetermined value.

The rotation limiting device is implemented by the rotation limiting device according to an aspect of the present disclosure.

One member of the first member and the second member is coupled and fixed to the steering shaft, and the other member of the first member and the second member is supported and fixed to a portion that does not rotate even during use.

Advantageous Effects of Invention

The rotation limiting device according to an aspect of the present disclosure can be preassembled and assembled before being attached between a rotation member and a fixed portion.

DESCRIPTION OF EMBODIMENTS

First Example of Embodiment

A first example of an embodiment of the present disclosure will be described with reference to FIG. 1 to (C) of FIG. 5. This example is an example in which a rotation limiting device 4 is incorporated in a steering unit 3 constituting the steering device 1 in order to limit the number of lock-to-lock turns of a steering wheel 2 of a steer-by-wire type steering device 1.

Hereinafter, first, an overall structure of the steering device 1 will be described, and then a structure and operation of the rotation limiting device 4 will be described.

<Overall Structure of Steering Device 1>

Figure 1:
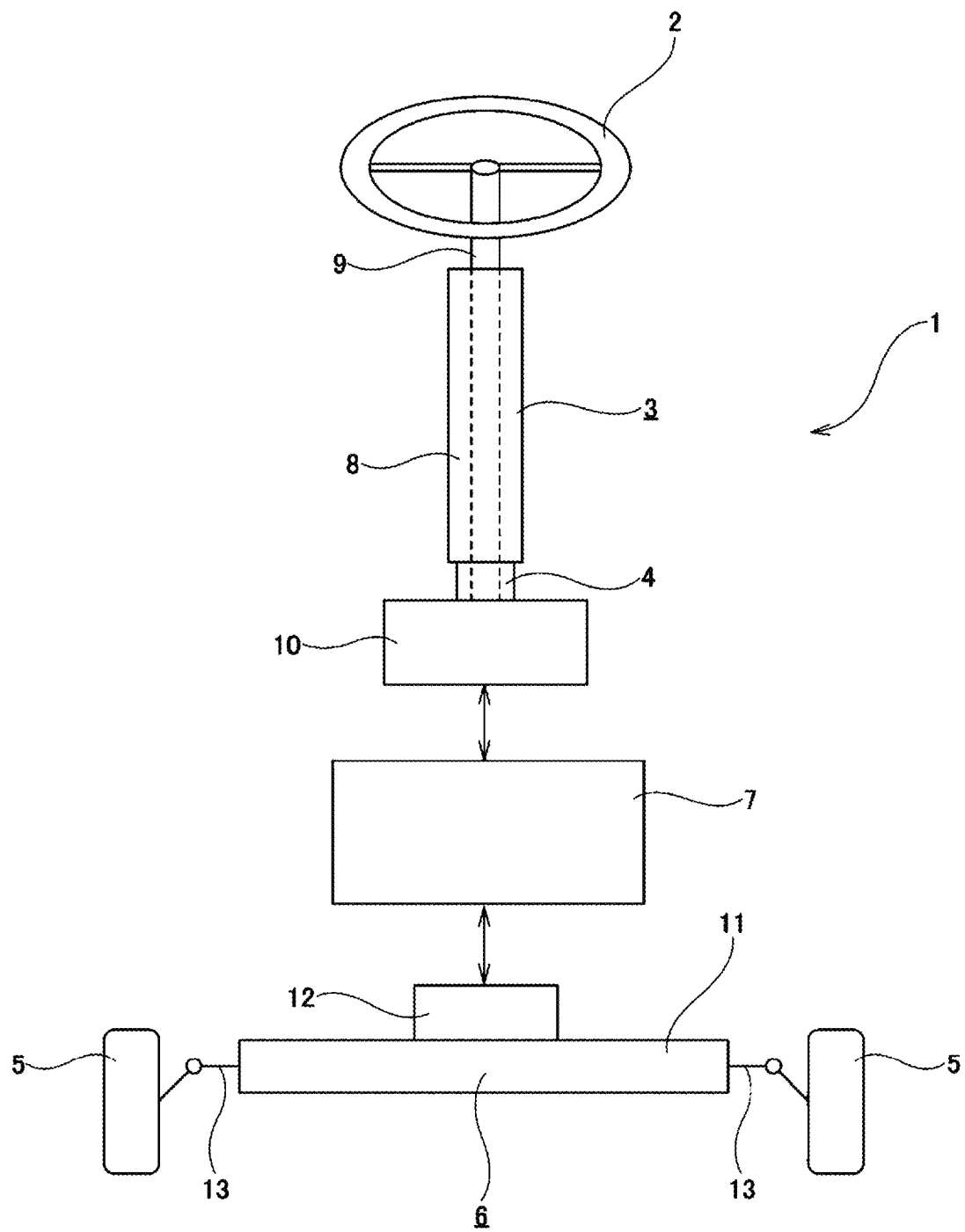
FIG. 1 is a schematic view showing an example of a steer-by-wire type steering device including a rotation limiting device according to a first example of an embodiment of the present disclosure.
Figure 2:
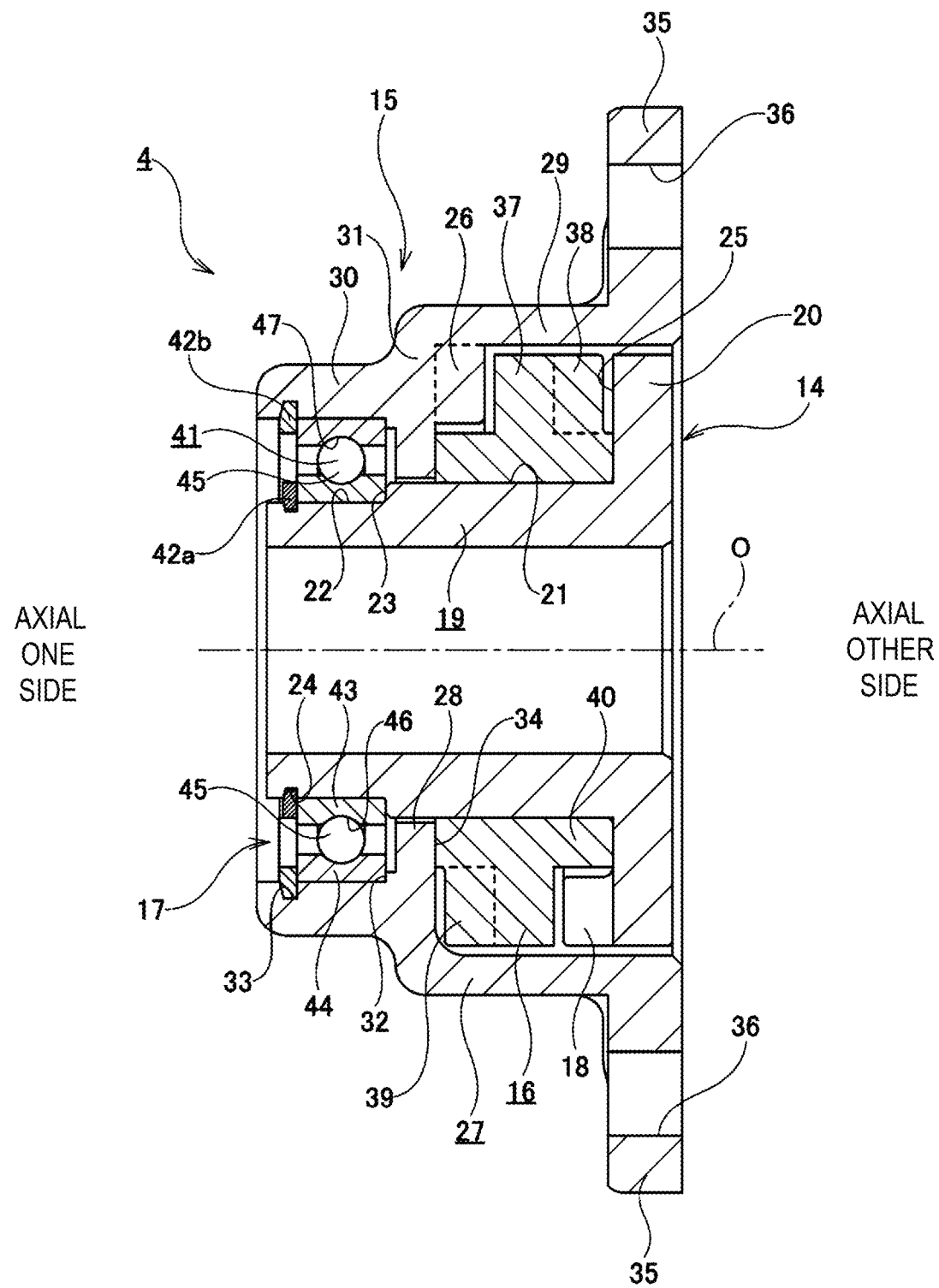
FIG. 2 is a cross-sectional view showing the rotation limiting device according to the first example of the embodiment of the present disclosure.
Figure 3:
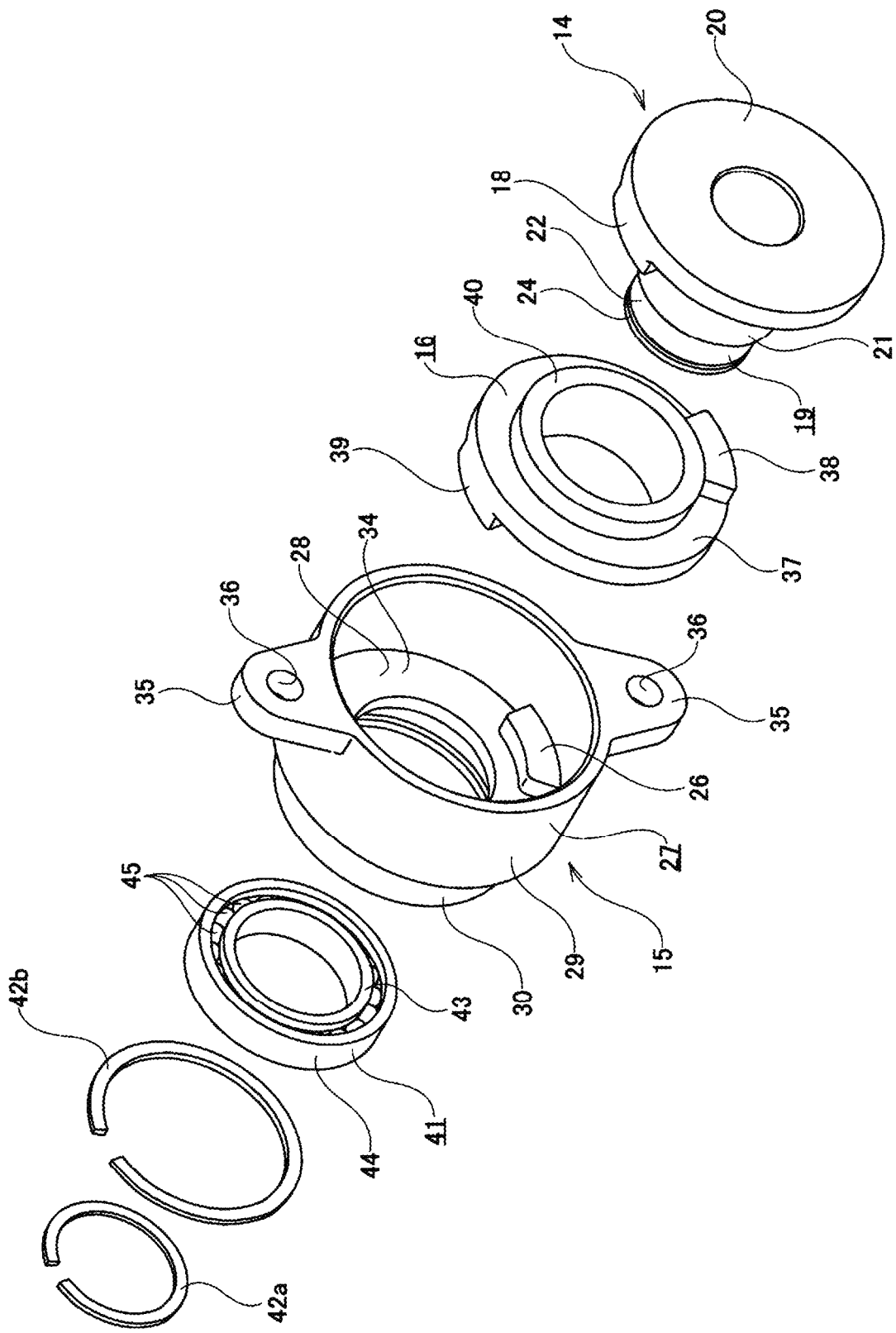
FIG. 3 is an exploded perspective view showing the rotation limiting device according to the first example of the embodiment of the present disclosure.

As shown in FIG. 1, the steering device 1 includes the steering unit 3 including the steering wheel 2, a steered unit 6 that applies a steering angle to a pair of steered wheels 5, and a control unit (ECU) 7. The steering device 1 has a linkless structure in which the steering unit 3 and the steered unit 6 are not mechanically connected to each other, but are electrically connected to each other via the control unit 7.

The steering unit 3 includes a steering column 8, a steering shaft 9, a reaction force applying device 10, and the rotation limiting device 4.

The steering column 8 has a tubular shape and is supported on a vehicle body.

The steering shaft 9 is rotatably supported on a radially inner side of the steering column 8. The steering wheel 2 is supported and fixed to an end portion of the steering shaft 9 on a rear side.

The reaction force applying device 10 is connected to an end portion of the steering shaft 9 on a front side. The reaction force applying device 10 includes a reaction force applying motor and a reducer such as a worm gear reducer, and increases the output torque of the reaction force applying motor by the reducer and then applies it to the steering shaft 9.

The rotation limiting device 4 is provided between the steering shaft 9 and a portion that does not rotate even during use, and limits the number of lock-to-lock turns of the steering wheel 2. In this example, the rotation limiting device 4 is provided between a front portion of the steering shaft 9 and an end portion of the steering column 8 on the front side. The rotation limiting device 4 can be provided at any position as long as the rotation limiting device 4 is between the steering shaft 9 and a fixed portion that does not rotate even during use. Specifically, the rotation limiting device 4 may also be provided in a portion closer to the steering wheel 2, for example, between a rear portion of the steering shaft 9 and a rear end portion of the steering column 8. Alternatively, the rotation limiting device 4 may be provided between the end portion of the steering shaft 9 on the front side and a housing of the reaction force applying device 10. When the rotation limiting device 4 is disposed between the end portion of the steering shaft 9 on the front side and the housing of the reaction force applying device 10, the rotation limiting device 4 can be relatively easily attached or detached. A specific configuration of the rotation limiting device 4 will be described later.

The steering unit 3 further includes a sensor such as a torque sensor or a steering angle sensor that measures an operation of the steering wheel 2 by a driver.

The steered unit 6 includes a gear housing 11 that is supported and fixed to the vehicle body, a linear motion member, and a steering actuator 12 that linearly drives the linear motion member.

The linear motion member is implemented by a rack shaft, a screw shaft, and the like. The linear motion member has an axial direction thereof oriented in a width direction of the vehicle body, and is supported inside the gear housing 11 so as to be capable of linear motion in the axial direction. Base end portions of a pair of tie rods 13 are coupled to end portions of the linear motion member on both sides in the axial direction via spherical joints (not shown), and a pair of steered wheels 5 are supported at tip end portions of the pair of tie rods 13.

When the linear motion member is implemented by a rack shaft, the steering actuator 12 includes a pinion shaft that meshes with the rack shaft, a steering motor, and a reducer. The output torque of the steering motor is increased by the reducer and then input to the pinion shaft, which is rotated to cause the rack shaft to move linearly.

When the linear motion member is implemented by a screw shaft, the steering actuator 12 includes a nut supported around the screw shaft so as to be rotatable with respect to the screw shaft, a steering motor, and a reducer. The steering actuator 12 increases the output torque of the steering motor by the reducer and then inputs it to the nut, and the nut is rotated and driven to linearly move the screw shaft. It should be noted that a feed screw mechanism including a screw shaft and a nut may be configured as a sliding screw type feed screw mechanism in which a male screw portion provided on an outer peripheral surface of the screw shaft and a female screw portion provided on an inner peripheral surface of the nut are directly screwed together, or may also be configured as a ball screw type feed screw mechanism in which a plurality of balls are arranged to roll freely between an inner diameter side ball screw groove provided in an outer peripheral surface of the screw shaft and an outer diameter side ball screw groove provided in an inner peripheral surface of the nut.

In the steering device 1 according to this example, when the driver operates the steering wheel 2, the operation of the steering wheel 2 is measured by a sensor of the steering unit 3, and a measurement result is output to the control unit 7. The control unit 7 receives various signals indicating driving conditions such as steering torque measured by a torque sensor, a steering angle measured by a steering angle sensor, a vehicle speed, a yaw rate, and acceleration. The control unit 7 drives the steering actuator 12 provided in the steered unit 6 based on various signals indicating the driving conditions. As a result, the linear motion member is displaced in the width direction of the vehicle body, and the pair of tie rods 13 are pushed and pulled, thereby applying a steering angle to the pair of steered wheels 5.

<Structure of Rotation Limiting Device 4>

The rotation limiting device 4 of the present example is provided between the front portion of the steering shaft 9 and the steering column 8 that does not rotate even during use. By limiting a rotatable amount of the steering shaft 9 to a predetermined value, the number of lock-to-lock turns of the steering wheel 2 is limited. In this example, the rotation limiting device 4 includes a first member 14, a second member 15, one intermediate member 16, and a rotation support mechanism 17.

In the following description, including this example, an axial one side refers to a front side of the vehicle, that is, the left side in FIGS. 2 to 13, and an axial other side refers to a rear side of the vehicle, that is, the right side in FIGS. 2 to 13.

The first member 14 has a first protrusion 18.

In this example, the first member 14 includes a first cylindrical portion 19 and a first flange portion 20 having a hollow circular plate shape protruding toward a radially outer side from an outer peripheral surface of an end portion of the first cylindrical portion 19 on the axial other side.

The first cylindrical portion 19 is externally fitted and fixed to the front portion of the steering shaft 9 so as not to be rotatable relative to the front portion. That is, the first member 14 rotates together with the steering shaft 9. In this example, the first cylindrical portion 19 has an outer peripheral surface shaped like a stepped cylindrical surface formed by connecting a large diameter cylindrical surface portion 21 on the axial other side and a small diameter cylindrical surface portion 22 on the axial one side by an inner diameter side stepped surface 23 facing the axial one side. The large diameter cylindrical surface portion 21 is formed of a cylindrical surface whose outer diameter does not change in the axial direction. The small diameter cylindrical surface portion 22 is formed of a cylindrical surface whose outer diameter does not change in the axial direction, except for an inner diameter side locking groove 24 provided over the entire circumference of an axial one side portion. The inner diameter side stepped surface 23 is formed of a flat surface orthogonal to a central axis O of the first member 14.

The first flange portion 20 has a first side surface 25 on an axial one side surface, and has the first protrusion 18 protruding toward the axial one side at one position in the circumferential direction of a radially outer side portion of the first side surface 25. A radially inner side surface of the first protrusion 18 faces an end portion of the large diameter cylindrical surface portion 21 on the axial other side with a gap therebetween.

In this example, the first protrusion 18 has a sector-shaped end surface when viewed from the axial one side. That is, the radially inner side surface and a radially outer side surface of the first protrusion 18 have a circular arc-shaped contour centered on a central axis O of the first member 14 when viewed from the axial one side. The radially outer side surface of the first protrusion 18 is in a cylindrical surface the same as an outer peripheral surface of the first flange portion 20. That is, the first protrusion 18 does not protrude toward a radially outer side from the first flange portion 20. Side surfaces of the first protrusion 18 on both sides in the circumferential direction have a linear contour shape extending in a radiation direction about the central axis O of the first member 14 when viewed from the axial one side, and extend linearly in the axial direction when viewed from the radially outer side. That is, the side surfaces of the first protrusion 18 on both sides in the circumferential direction exist within an imaginary plane including the central axis O of the first member 14. In this example, a circumferential width of the first protrusion 18, that is, an angle formed by the side surfaces on both sides in the circumferential direction, is set to 45 degrees.

The second member 15 has a second protrusion 26 disposed on the axial one side with respect to the first protrusion 18, and is disposed around the first member 14 coaxially with the first member 14 and capable of relative rotation with respect to the first member 14.

In this example, the second member 15 includes a second cylindrical portion 27 and a second flange portion 28.

The second cylindrical portion 27 has a stepped cylindrical shape formed by connecting a large diameter cylindrical portion 29 on the axial other side and a small diameter cylindrical portion 30 on the axial one side by a connecting plate portion 31 having a hollow circular plate shape.

The large diameter cylindrical portion 29 is formed by a cylindrical surface in which an inner peripheral surface on an axial other side portion does not change in inner diameter in the axial direction excluding an end portion on the axial one side to which an end portion of the second protrusion 26 on the radially outer side is connected.

The small diameter cylindrical portion 30 has an outer diameter side stepped surface 32 facing the axial one side at an end portion on the axial other side of an inner peripheral surface, and has an outer diameter side locking groove 33 over the entire circumference at an axial one side portion of the inner peripheral surface.

The second flange portion 28 protrudes toward the radially inner side from an inner peripheral surface of the connecting plate portion 31 over the entire circumference. That is, the second flange portion 28 is formed in a hollow circular shape. The second flange portion 28 has a second side surface 34 on the axial other side surface, and has the second protrusion 26 at one position of a radially outer side portion of the second side surface 34. An end portion of the second protrusion 26 on the radially outer side is connected to an end portion on the axial one side of the inner peripheral surface of the large diameter cylindrical portion 29.

In this example, the second protrusion 26 has a sector-shaped end surface when viewed from the axial other side. That is, a radially inner side surface and a radially outer side surface of the second protrusion 26 have a circular arc-shaped contour centered on the central axis O of the second member 15 when viewed from the axial other side. Side surfaces of the second protrusion 26 on both sides in the circumferential direction have a linear contour shape extending in a radiation direction about the central axis O of the second member 15 when viewed from the axial other side, and extend linearly in the axial direction when viewed from the radially inner side. That is, the side surfaces of the second protrusion 26 on both sides in the circumferential direction exist within an imaginary plane including the central axis O of the second member 15. In this example, a circumferential width of the second protrusion 26 is set to 45 degrees.

The second member 15 further includes a pair of ear portions 35 protruding to the radially outer side from two radially opposite positions on an end portion on the axial other side of the large diameter cylindrical portion 29 of the second cylindrical portion 27. Each of the ear portions 35 has a coupling hole 36 passing therethrough in the axial direction. In this example, the coupling hole 36 is formed as a cylindrical hole whose inner diameter does not change in the axial direction. The rotation limiting device 4 of the present example is supported and fixed to the steering column 8 that does not rotate even during use by screwing the coupling bolts, which are inserted through the coupling holes 36 of the pair of ear portions 35 of the second member 15, into the column side screw holes that open in a front side surface of the steering column 8.

The intermediate member 16 includes a side plate portion 37 disposed between the first protrusion 18 and the second protrusion 26 in the axial direction, an intermediate side first protrusion 38 protruding from an axial other side surface of the side plate portion 37 toward the axial other side, and an intermediate side second protrusion 39 protruding from an axial one side surface of the side plate portion 37 toward the axial one side. The intermediate member 16 is supported coaxially with the first member 14 and the second member 15, and is relatively rotatable with respect to the first member 14 and the second member 15.

In this example, the intermediate member 16 includes a cylindrical intermediate cylindrical portion 40 that is externally fitted to the first cylindrical portion 19 of the first member 14 so as to be rotatable relative to the first cylindrical portion 19, and the side plate portion 37 in a hollow circular plate shape that protrudes toward the radially outer side from an outer peripheral surface of an intermediate portion of the intermediate cylindrical portion 40 in the axial direction.

Further, the intermediate member 16 has the intermediate side first protrusion 38 protruding toward the axial other side from the axial other side surface of the side plate portion 37 at one position in the circumferential direction, and the intermediate side second protrusion 39 protruding toward the axial one side from the axial one side surface of the side plate portion 37 at one position radially opposite to the intermediate side first protrusion 38 (one position whose phase in the circumferential direction is shifted by 180 degrees from the intermediate side first protrusion 38). An end portion of the intermediate side first protrusion 38 on the radially inner side is connected to an axial other side portion of an outer peripheral surface of the intermediate cylindrical portion 40, and an end portion of the radially inner side of the intermediate side second protrusion 39 is connected to an axial one side portion of an outer peripheral surface of the intermediate cylindrical portion 40.

In this example, the intermediate side first protrusion 38 has a sector-shaped end surface when viewed from the axial other side. That is, a radially inner side surface and a radially outer side surface of the intermediate side first protrusion 38 have a circular arc-shaped contour centered on a central axis O of the intermediate member 16 when viewed from the axial other side. A radially outer side surface of the intermediate side first protrusion 38 is in a cylindrical surface the same as the outer peripheral surface of the side plate portion 37. That is, the intermediate side first protrusion 38 is formed integrally with the side plate portion 37 and does not protrude toward the radially outer side from the side plate portion 37. That is, the intermediate side first protrusion 38 is located on the radially inner side of the outer peripheral surface of the side plate portion 37. The radially outer side surface of the intermediate side first protrusion 38 may not necessarily be in the same cylindrical surface as the outer peripheral surface of the side plate portion 37 as long as the radially outer side surface of the intermediate side first protrusion 38 is located on the radially inner side of the outer peripheral surface of the side plate portion 37. Side surfaces of the intermediate side first protrusion 38 on both sides in the circumferential direction have a linear contour shape extending in a radiation direction about the central axis O of the intermediate member 16 when viewed from the axial other side, and extend linearly in the axial direction when viewed from the radially outer side. That is, the side surfaces of the intermediate side first protrusion 38 on both sides in the circumferential direction exist within the imaginary plane including the central axis O of the intermediate member 16. In this example, a circumferential width of the intermediate side first protrusion 38 is set to 45 degrees.

In this example, the intermediate side second protrusion 39 has a sector-shaped end surface when viewed from the axial one side. That is, a radially inner side surface and a radially outer side surface of the intermediate side second protrusion 39 have a circular arc-shaped contour centered on a central axis O of the intermediate member 16 when viewed from the axial one side. A radially outer side surface of the intermediate side second protrusion 39 is in a cylindrical surface the same as the outer peripheral surface of the side plate portion 37. That is, the intermediate side second protrusion 39 is formed integrally with the side plate portion 37 and does not protrude toward the radially outer side from the side plate portion 37. That is, the intermediate side second protrusion 39 is located on the radially inner side of the outer peripheral surface of the side plate portion 37. The radially outer side surface of the intermediate side second protrusion 39 may not necessarily be in the same cylindrical surface as the outer peripheral surface of the side plate portion 37 as long as the radially outer side surface of the intermediate side second protrusion 39 is located on the radially inner side of the outer peripheral surface of the side plate portion 37. Side surfaces of the intermediate side second protrusion 39 on both sides in the circumferential direction have a linear contour shape extending in a radiation direction about the central axis O of the intermediate member 16 when viewed from the axial one side, and extend linearly in the axial direction when viewed from the radially outer side. That is, the side surfaces of the intermediate side second protrusion 39 on both sides in the circumferential direction exist within the imaginary plane including the central axis O of the intermediate member 16. In this example, a circumferential width of the intermediate side second protrusion 39 is set to 45 degrees.

The rotation support mechanism 17 supports the second member 15 around the first member 14 so as to allow relative rotation with respect to the first member 14 and to prevent inadvertent separation. In this example, the rotation support mechanism 17 is disposed between the small diameter cylindrical surface portion 22 of the first member 14 and the inner peripheral surface of the small diameter cylindrical portion 30 of the second member 15.

In this example, the rotation support mechanism 17 includes a radial rolling bearing 41 and two retaining rings 42a and 42b each having a segmented annular shape (having an end surface shape in a C shape when viewed in the axial direction).

The radial rolling bearing 41 includes an inner ring 43, an outer ring 44, and a plurality of rolling elements 45.

The inner ring 43 has an inner ring raceway 46 on an outer peripheral surface thereof, and is externally fitted to the small diameter cylindrical surface portion 22 of the first member 14 without rattling. Further, the inner ring 43 abuts against the inner diameter side stepped surface 23 at an axial other side surface, and abuts against the retaining ring 42a locked to the inner diameter side locking groove 24 at an axial one side surface. In other words, the inner ring 43 is sandwiched in the axial direction between the inner diameter side stepped surface 23 and the retaining ring 42a locked to the inner diameter side locking groove 24. Thus, the inner ring 43 is positioned with respect to the first member 14.

The outer ring 44 has an outer ring raceway 47 on an inner peripheral surface thereof, and is fitted in the small diameter cylindrical portion 30 of the second member 15 without rattling. Further, the outer ring 44 abuts against the outer diameter side stepped surface 32 at an axial other side surface, and abuts against the retaining ring 42b locked to the outer diameter side locking groove 33 at an axial one side surface. In other words, the outer ring 44 is sandwiched in the axial direction between the outer diameter side stepped surface 32 and the retaining ring 42b locked to the outer diameter side locking groove 33. Thus, the outer ring 44 is positioned with respect to the second member 15.

The rolling elements 45 are disposed between the inner ring raceway 46 of the inner ring 43 and the outer ring raceway 47 of the outer ring 44 so as to be able to roll freely. In this example, balls are used as the rolling elements 45. That is, the radial rolling bearing 41 is implemented by a radial ball bearing.

The rotation limiting device 4 of the this example is assembled by arranging the rotation support mechanism 17 between the small diameter cylindrical surface portion 22 of the first member 14 and the inner peripheral surface of the small diameter cylindrical portion 30 of the second member 15 in a state where the intermediate cylindrical portion 40 of the intermediate member 16 is externally fitted to the large diameter cylindrical surface portion 21 of the first member 14 so as to be relatively rotatable without rattling and the second member 15 is disposed around the first member 14 and the intermediate member 16.

When the rotation limiting device 4 is assembled, the inner peripheral surface of the large diameter cylindrical portion 29 of the second member 15 faces the outer peripheral surface of the first flange portion 20 of the first member 14 and the radially outer side surface of the first protrusion 18, the outer peripheral surface of the side plate portion 37 of the intermediate member 16, the radially outer side surface of the intermediate side first protrusion 38, and the radially outer side surface of the intermediate side second protrusion 39 with gaps, and an inner peripheral surface of the second flange portion 28 faces an end portion of the large diameter cylindrical surface portion 21 of the first member 14 on the axial one side with a gap. A radially inner side portion of the first side surface 25 is in sliding contact with or closely opposed to an end surface of the intermediate cylindrical portion 40 on the axial other side, and a radially inner side portion of the second side surface 34 is in sliding contact with or closely opposed to an end surface of the intermediate cylindrical portion 40 on the axial one side. An axial one side surface of the first protrusion 18 faces the axial other side surface of the side plate portion 37 with a gap therebetween, and an axial other side surface of the second protrusion 26 faces the axial one side surface of the side plate portion 37 with a gap therebetween. Further, an axial other side surface of the intermediate side first protrusion 38 faces the first side surface 25 with a gap therebetween, and an axial one side surface of the intermediate side second protrusion 39 faces the second side surface 34 with a gap therebetween.

<Operation of Rotation Limiting Device 4>

The operation of the rotation limiting device 4 according to this example will be described with reference to (A) of FIG. 4 to (C) of FIG. 5. (A) of FIG. 4 to (C) of FIG. 5 are views schematically illustrating the first protrusion 18 of the first member 14, the second protrusion 26 of the second member 15, and the intermediate member 16 as viewed from the radially outer side. In the following description, a circumferential one side refers to a front side in a counterclockwise direction as seen from a driver seated in a driver seat, that is, the lower side in (A) of FIG. 4 to (C) of FIG. 5, and a circumferential other side refers to a front side in a clockwise direction as seen from the driver seated in the driver seat, that is, the upper side in (A) of FIG. 4 to (C) of FIG. 5.

Figure 4:
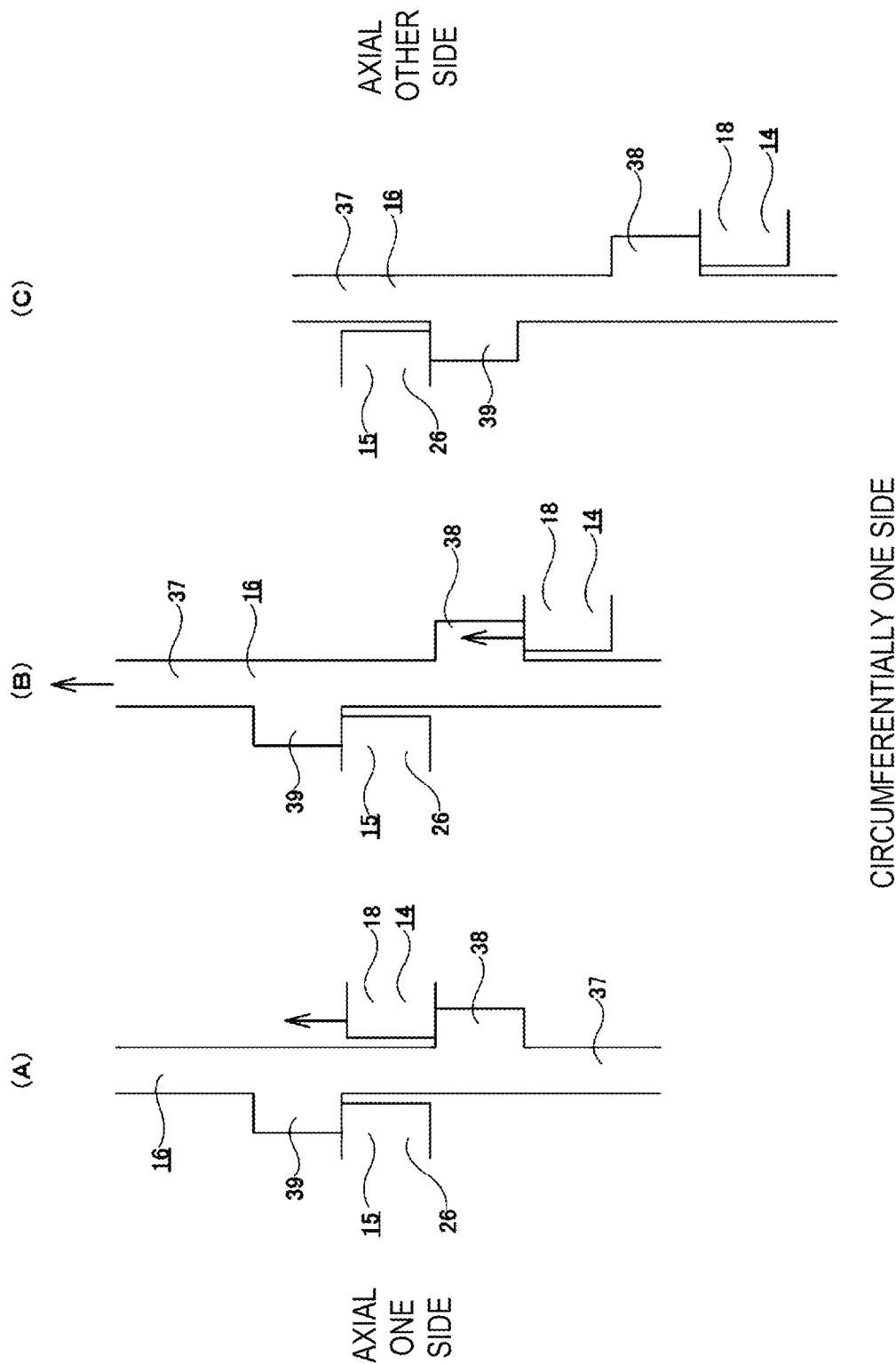
FIG. 4 (A) to (C) of FIG. 4 are schematic views illustrating an operation of the rotation limiting device when a steering wheel is operated from fully left to fully right.

First, when the steering wheel 2 is operated from fully left (the counterclockwise direction as seen from the driver seated in the driver seat) to fully right (the clockwise direction as seen from the driver seated in the driver seat), the rotation limiting device 4 operates as shown in the order of (A) of FIG. 4→(B) of FIG. 4→(C) of FIG. 4.

That is, in a state in which the steering wheel 2 is operated to fully left, as shown in (A) of FIG. 4, a circumferential one side surface of the first protrusion 18 is in contact with a circumferential other side surface of the intermediate side first protrusion 38, and a circumferential other side surface of the second protrusion 26 is in contact with a circumferential one side surface of the intermediate side second protrusion 39.

From this state, when the steering wheel 2 is operated to the right and the steering shaft 9 is rotated in the clockwise direction, as shown by an arrow in (A) of FIG. 4, only the first member 14 rotates in the clockwise direction (toward the circumferential other side) while the circumferential other side surface of the second protrusion 26 remains in contact with the circumferential one side surface of the intermediate side second protrusion 39. Then, when the first member 14 is rotated by an angle smaller than 360 degrees by the sum of the circumferential width of the first protrusion 18 and the circumferential width of the intermediate side first protrusion 38, that is, 270 degrees in this example, as shown in (B) of FIG. 4, the circumferential other side surface of the first protrusion 18 comes into contact with the circumferential one side surface of the intermediate side first protrusion 38. In this state, the steering wheel 2 is located at the center, and the pair of steered wheels 5 are oriented in a straight ahead direction.

When the steering wheel 2 is further operated to the right from the state shown in (B) of FIG. 4, as indicated by an arrow in (B) of FIG. 4, the circumferential one side surface of the intermediate side first protrusion 38 is pressed toward the circumferential other side by the circumferential other side surface of the first protrusion 18. As a result, the first member 14 and the intermediate member 16 rotate together in the clockwise direction (toward the circumferential other side). Then, when the first member 14 and the intermediate member 16 are rotated in the clockwise direction by an angle smaller than 360 degrees by the sum of the circumferential width of the second protrusion 26 and the circumferential width of the intermediate side second protrusion 39, that is, 270 degrees in this example, as shown in (C) of FIG. 4, a circumferential other side surface of the intermediate side second protrusion 39 comes into contact with a circumferential one side surface of the second protrusion 26. When the circumferential other side surface of the intermediate side second protrusion 39 comes into contact with the circumferential one side surface of the second protrusion 26, the intermediate member 16 is prevented from rotating further in the clockwise direction with respect to the second member 15. When the intermediate member 16 is prevented from rotating in the clockwise direction, the first member 14 is prevented from rotating further in the clockwise direction.

Alternatively, when the first member 14 rotates in the clockwise direction by operating the steering wheel 2 to the right from the state shown in (A) of FIG. 4, the intermediate member 16 is rotated together with the first member 14 due to a friction force acting between an outer peripheral surface of the first cylindrical portion 19 and an inner peripheral surface of the intermediate cylindrical portion 40, and the first member 14 and the intermediate member 16 rotate together. Then, the circumferential other side surface of the intermediate side second protrusion 39 comes into contact with the circumferential one side surface of the second protrusion 26, and the intermediate member 16 is prevented from rotating further in the clockwise direction with respect to the second member 15. From this state, when the steering wheel 2 is further operated to the right, only the first member 14 rotates in the clockwise direction. Then, the circumferential other side surface of the first protrusion 18 comes into contact with the circumferential one side surface of the intermediate side first protrusion 38, and the first member 14 is prevented from rotating further in the clockwise direction with respect to the intermediate member 16.

In either case, when the first member 14 is prevented from rotating further in the clockwise direction, the steering shaft 9 and the steering wheel 2 supported and fixed to the steering shaft 9 are prevented from rotating further in the clockwise direction.

Figure 5:
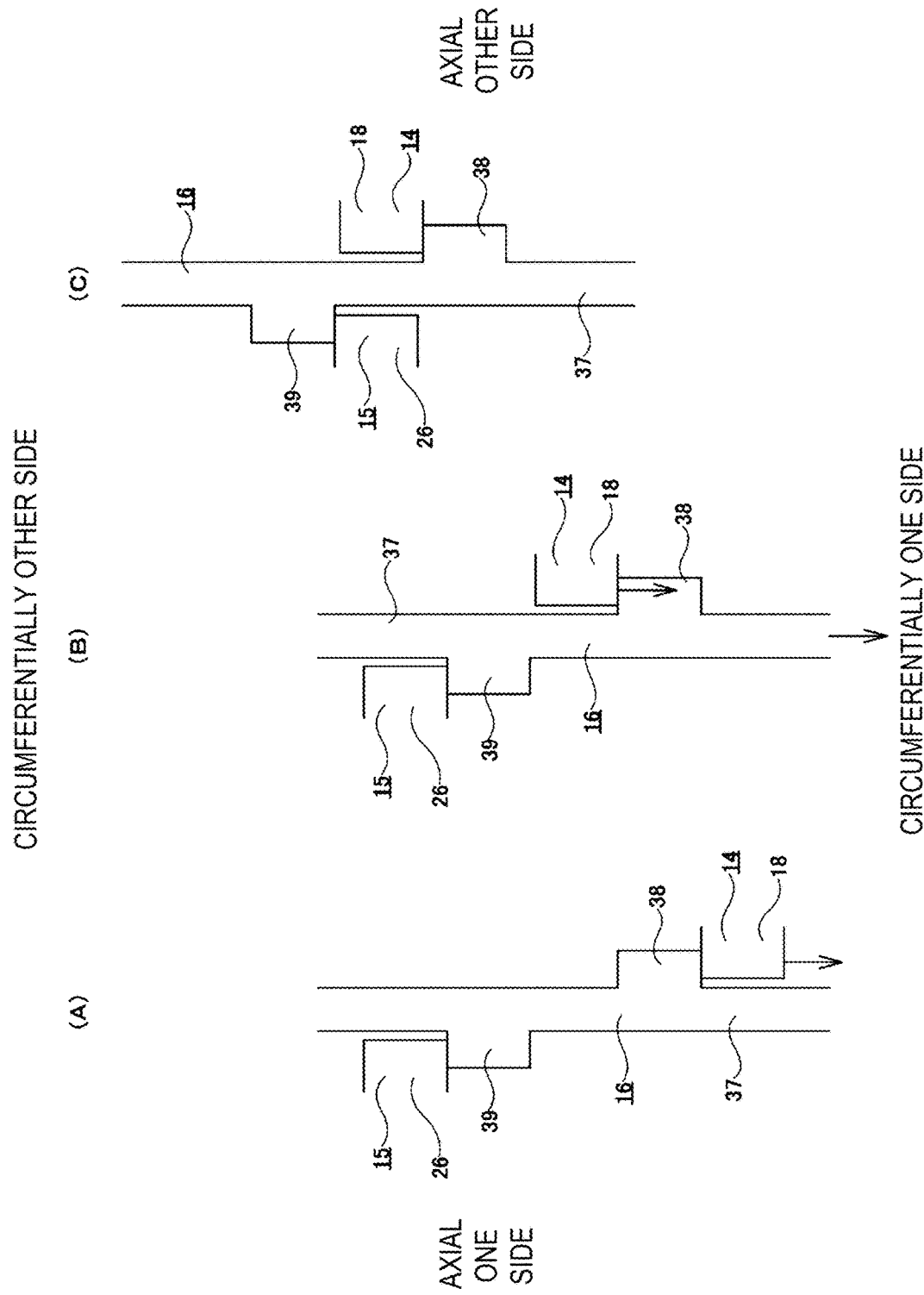
FIG. 5 (A) to (C) of FIG. 5 are schematic views illustrating an operation of the rotation limiting device when the steering wheel is operated from fully right to fully left.

Next, when the steering wheel 2 is operated from fully right to fully left, the rotation limiting device 4 operates as shown in the order of (A) of FIG. 5→(B) of FIG. 5→(C) of FIG. 5.

That is, in a state in which the steering wheel 2 is operated to fully right, as shown in (A) of FIG. 5, the circumferential other side surface of the first protrusion 18 is in contact with the circumferential one side surface of the intermediate side first protrusion 38, and the circumferential one side surface of the second protrusion 26 is in contact with the circumferential other side surface of the intermediate side second protrusion 39.

From this state, when the steering wheel 2 is operated to the left and the steering shaft 9 is rotated in the counterclockwise direction, as shown by an arrow in (A) of FIG. 5, only the first member 14 rotates in the counterclockwise direction (toward the circumferential one side) while the circumferential one side surface of the second protrusion 26 remains in contact with the circumferential other side surface of the intermediate side second protrusion 39. Then, when the first member 14 is rotated by an angle smaller than 360 degrees by the sum of the circumferential width of the first protrusion 18 and the circumferential width of the intermediate side first protrusion 38, that is, 270 degrees in this example, as shown in (B) of FIG. 5, the circumferential one side surface of the first protrusion 18 comes into contact with the circumferential other side surface of the intermediate side first protrusion 38. In this state, the steering wheel 2 is located at the center, and the pair of steered wheels 5 are oriented in a straight ahead direction.

When the steering wheel 2 is further operated to the left from the state shown in (B) of FIG. 5, as indicated by an arrow in (B) of FIG. 5, the circumferential other side surface of the intermediate side first protrusion 38 is pressed toward the circumferential one side by the circumferential one side surface of the first protrusion 18. As a result, the first member 14 and the intermediate member 16 rotate together in the counterclockwise direction (toward the circumferential one side). Then, when the first member 14 and the intermediate member 16 are rotated in the counterclockwise direction by an angle smaller than 360 degrees by the sum of the circumferential width of the second protrusion 26 and the circumferential width of the intermediate side second protrusion 39, that is, 270 degrees in this example, as shown in (C) of FIG. 5, the circumferential one side surface of the intermediate side second protrusion 39 comes into contact with the circumferential other side surface of the second protrusion 26. When the circumferential one side surface of the intermediate side second protrusion 39 comes into contact with the circumferential other side surface of the second protrusion 26, the intermediate member 16 is prevented from rotating further in the counterclockwise direction with respect to the second member 15. When the intermediate member 16 is prevented from rotating in the counterclockwise direction, the first member 14 is prevented from rotating further in the counterclockwise direction.

Alternatively, when the first member 14 rotates in the counterclockwise direction by operating the steering wheel 2 to the left from the state shown in (A) of FIG. 5, the intermediate member 16 is rotated together with the first member 14 due to a friction force acting between an outer peripheral surface of the first cylindrical portion 19 and an inner peripheral surface of the intermediate cylindrical portion 40, and the first member 14 and the intermediate member 16 rotate together. Then, the circumferential one side surface of the intermediate side second protrusion 39 comes into contact with the circumferential other side surface of the second protrusion 26, and the intermediate member 16 is prevented from rotating further in the counterclockwise direction with respect to the second member 15. From this state, when the steering wheel 2 is further operated to the left, only the first member 14 rotates in the counterclockwise direction. Then, the circumferential one side surface of the first protrusion 18 comes into contact with the circumferential other side surface of the intermediate side first protrusion 38, and the first member 14 is prevented from rotating further in the counterclockwise direction with respect to the intermediate member 16.

In either case, when the first member 14 is prevented from rotating further in the counterclockwise direction, the steering shaft 9 and the steering wheel 2 supported and fixed to the steering shaft 9 are prevented from rotating further in the counterclockwise direction.

In the rotation limiting device 4 of this example, the second member 15 can be supported around the first member 14 by the rotation support mechanism 17 so as to allow relative rotation with respect to the first member 14 and to prevent inadvertent separation. Specifically, the rotation support mechanism 17 is disposed between the small diameter cylindrical surface portion 22 of the first member 14 and the inner peripheral surface of the small diameter cylindrical portion 30 of the second member 15 in a state where the intermediate cylindrical portion 40 of the intermediate member 16 is externally fitted to the large diameter cylindrical surface portion 21 of the first member 14 so as to be relatively rotatable without rattling and the second member 15 is disposed around the first member 14 and the intermediate member 16. Therefore, even in a state before the first member 14 is coupled and fixed to the steering shaft 9 and the second member 15 is supported and fixed to the steering column 8, the rotation limiting device 4 can be assembled in advance. Therefore, it is possible to facilitate the component management and the operation of assembling the rotation limiting device 4 to the steering unit 3, and to improve the ease of handling the rotation limiting device 4. On the other hand, the inventions described in Patent Literatures 1 to 5 described above does not have a mechanism such as the rotation support mechanism 17 in the present disclosure that supports the second member 15 around the first member 14 so as to allow relative rotation and prevents inadvertent separation, and the component management and the assembly work are complicated.

As described above, in the rotation limiting device 4 according to the present example, the intermediate member 16 includes the intermediate side first protrusion 38 protruding from the axial other side surface of the side plate portion 37 toward the axial other side, and the intermediate side second protrusion 39 protruding from the axial one side surface of the side plate portion 37 toward the axial one side.

On the other hand, Patent Literature 2 discloses that the idle rotors 14 to 16 have the engaging pieces 14a to 16a and 14b to 16b, but the multi-rotation limit mechanism of Patent Literature 2 is originally an device for detecting a rotational end of a rotation shaft, does not lock the rotation of the rotation shaft, and has a different configuration and function from the intermediate side first protrusion 38 and the intermediate side second protrusion 39 of the present disclosure.

Patent Literature 3 discloses a first engaging member 141 that is formed integrally with an intermediate engaging member 150 and extends in the axial direction. However, it is for preventing the occurrence of a striking sound when the first engaging member 141 comes into contact with first and second arms 161 and 162 of a biasing member 160, and has a different function from the intermediate side first protrusion 38 and the intermediate side second protrusion 39 of the present disclosure.

Patent Literature 4 discloses that a first contact portion 412 protruding from an integrated rotation portion 410 only in the axial one side is provided. However, a member protruding from the integrated rotation portion 410 in the axial other side is not disclosed.

Figure 8:
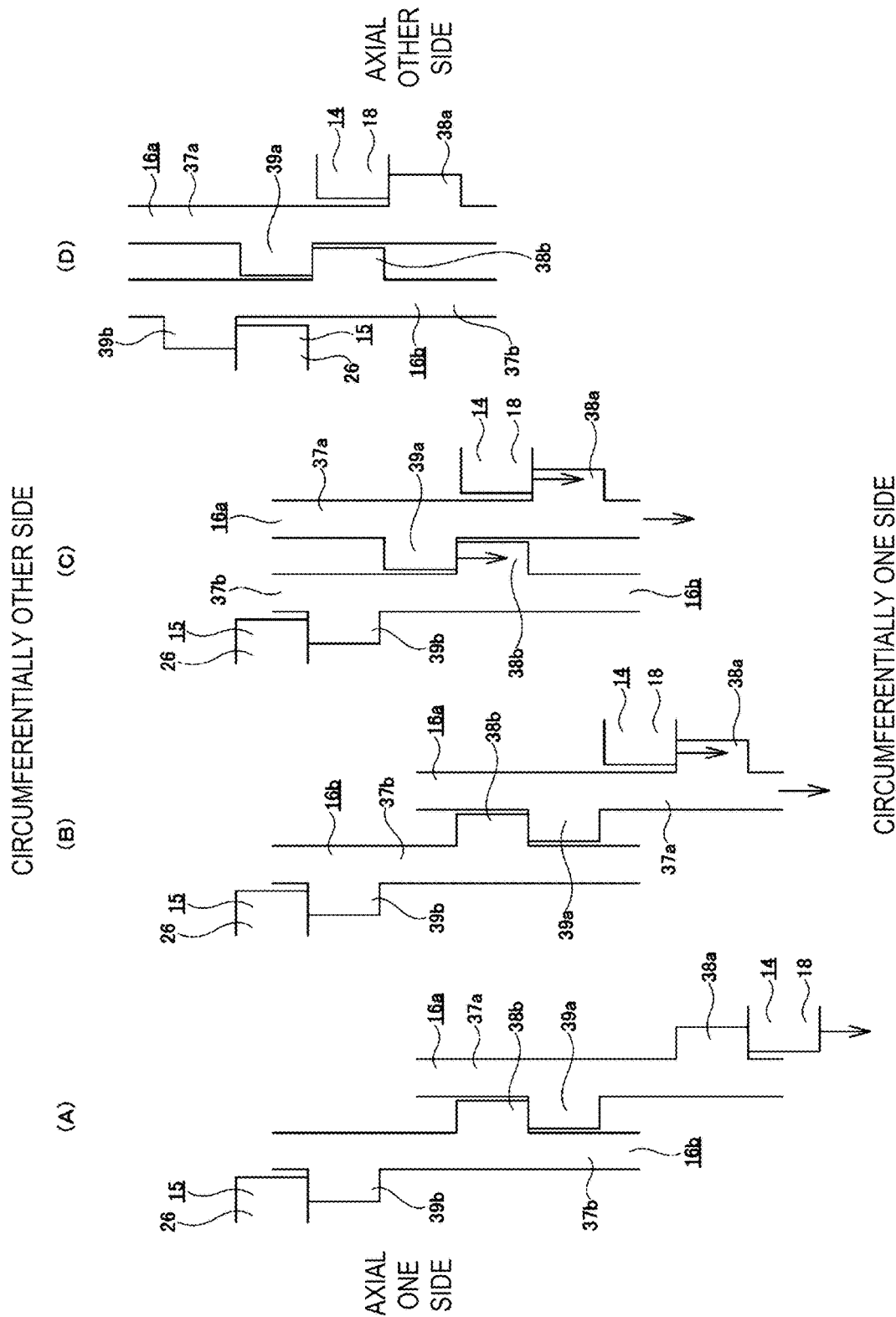
FIG. 8 (A) to (D) of FIG. 8 are schematic views illustrating an operation of a rotation limiting device when a steering wheel is operated from fully right to fully left according to the modification.

FIG. 8 of Patent Literature 5 discloses an outer peripheral support portion 175 formed so as to protrude to both sides in the axial direction of a second rotation member 170. However, the outer peripheral support portion 175 protrudes to the radially outer side from an outer peripheral side of the second rotation member 170. That is, since the outer peripheral support portion 175 is not located on the radially inner side of an outer peripheral surface of the second rotation member 170, it is disadvantageous in terms of compactness and strength. That is, if the outer peripheral support portion 175 repeatedly comes into contact with a first support portion 161 of a first rotation member 160 or an inner peripheral support portion 189 of a housing 180, the outer peripheral support portion 175 may be deformed or the outer peripheral support portion 175 may rotate as viewed from the radial direction. On the other hand, in the invention according to the present disclosure, the intermediate side first protrusion 38 and the intermediate side second protrusion 39 are formed integrally with the side plate portion 37, and do not protrude to the radially outer side from the side plate portion 37, so that the problem mentioned above is unlikely to occur. A third support portion 173 of the second rotation member 170 shown in FIG. 3 of Patent Literature 5 protrudes only in the axial one side, and is therefore different from the intermediate side first protrusion 38 and the intermediate side second protrusion 39 which protrude on both sides in the axial direction in the present disclosure.

Further, the rotation limiting device 4 according to the present example can adjust the rotatable amount of the steering shaft 9 coupled and fixed to the first member 14 by changing the number of intermediate members 16 disposed between the first protrusion 18 and the second protrusion 26 in the axial direction. Therefore, according to the rotation limiting device 4 of the present example, it is possible to improve the degree of freedom in setting the rotatable amount of the steering shaft 9. Specifically, as the number of the intermediate members 16 is increased, the rotatable amount of the steering shaft 9 can be increased.

Figure 6:
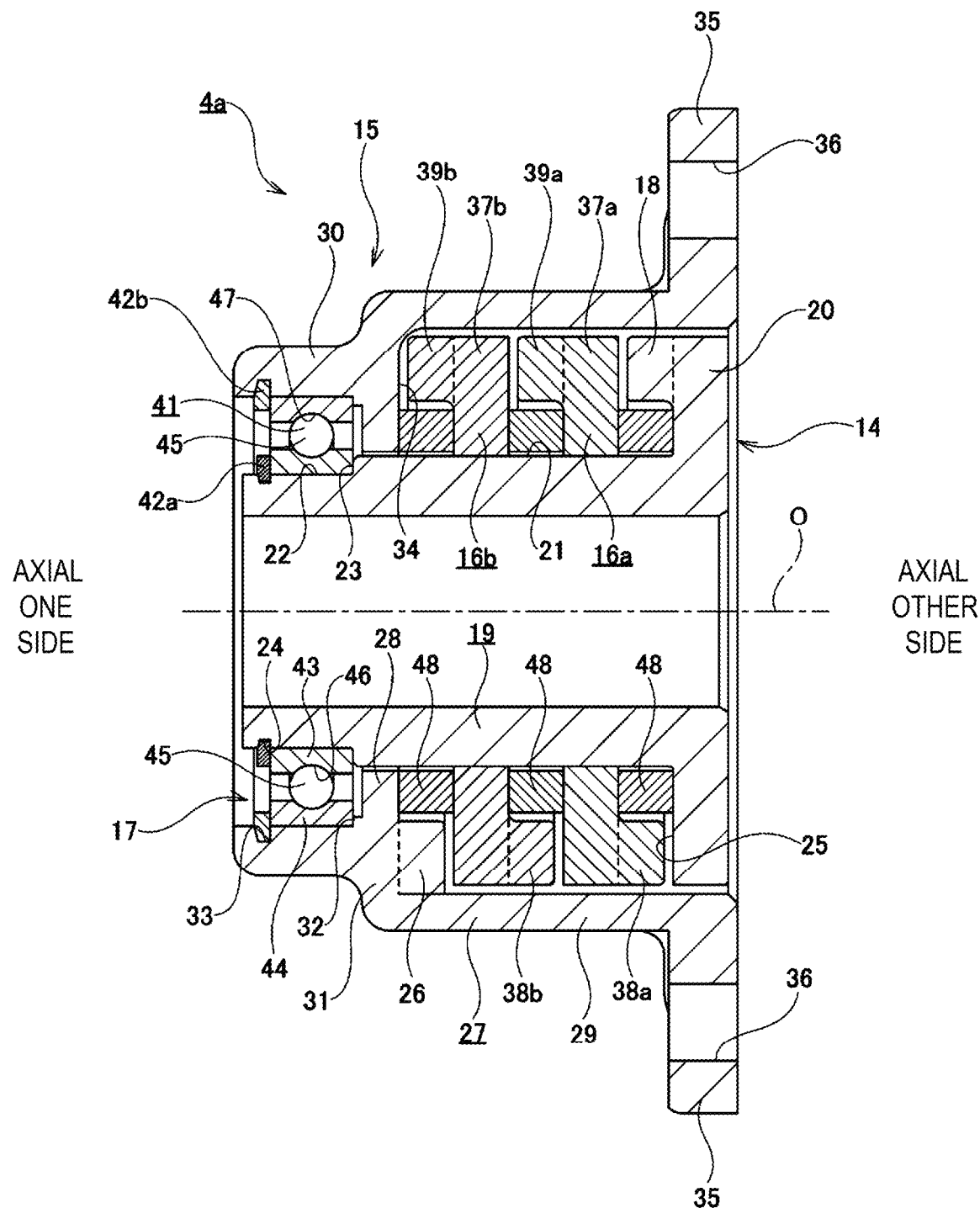
FIG. 6 is a cross-sectional view showing a modification of the first example of the embodiment of the present disclosure.

FIG. 6 to (D) of FIG. 8 show a rotation limiting device 4a including two intermediate members 16a and 16b. The intermediate members 16a and 16b respectively include: side plate portions 37a and 37b having a hollow circular plate shape; intermediate side first protrusions 38a and 38b protruding toward the axial other side from respective axial other side surfaces of the side plate portions 37a and 37b at one position in the circumferential direction; and intermediate side second protrusions 39a and 39b protruding toward the axial one side from respective axial one side surfaces at one position radially opposite to the intermediate side first protrusions 38a and 38b. That is, the intermediate members 16a and 16b do not include the intermediate cylindrical portion 40 that is provided in the intermediate member 16 according to the first example of the embodiment. The two intermediate members 16a and 16b are arranged in series in the axial direction and are externally fitted to the first cylindrical portion 19 of the first member 14 so as to be rotatable relative to each other. The intermediate member 16a on the axial other side and the intermediate member 16b on the axial one side are given different reference numerals for the sake of convenience of explanation, but have the same shape. An axial length of the large diameter cylindrical surface portion 21 of the first cylindrical portion 19 and an axial length of the large diameter cylindrical portion 29 of the second cylindrical portion 27 are longer than that of the structure according to the first example of the embodiment by an amount of the intermediate members 16a and 16b added.

The rotation limiting device 4a according to the present modification includes three annular gap adjusting members 48. Among the three gap adjusting members 48, the gap adjusting member 48 on the axial other side is sandwiched in the axial direction between a radially inner side portion of an axial other side surface of the side plate portion 37a of the intermediate member 16a on the axial other side and a radially inner side portion of an axial one side surface (the first side surface 25) of the first flange portion 20 of the first member 14. The gap adjusting member 48 in the middle is sandwiched in the axial direction between a radially inner side portion of an axial one side surface of the side plate portion 37a of the intermediate member 16a on the axial other side and a radially inner side portion of an axial other side surface of the side plate portion 37b of the intermediate member 16b on the axial one side. The gap adjusting member 48 on the axial one side is sandwiched in the axial direction between a radially inner side portion of an axial one side surface of the side plate portion 37b of the intermediate member 16b on the axial one side and a radially inner side portion of an axial other side surface (the second side surface 34) of the second flange portion 28 of the second member 15.

In the present modification, each of the gap adjusting members 48 is formed of a spacer made of a material having a small friction coefficient with respect to the axial one side surface of the first flange portion 20 and the axial other side surface of the second flange portion 28, and/or the side plate portions 37a, 37b. Specifically, for example, each of the gap adjusting members 48 may be made of a resin washer, an oil-retaining metal, or the like.

Figure 7:
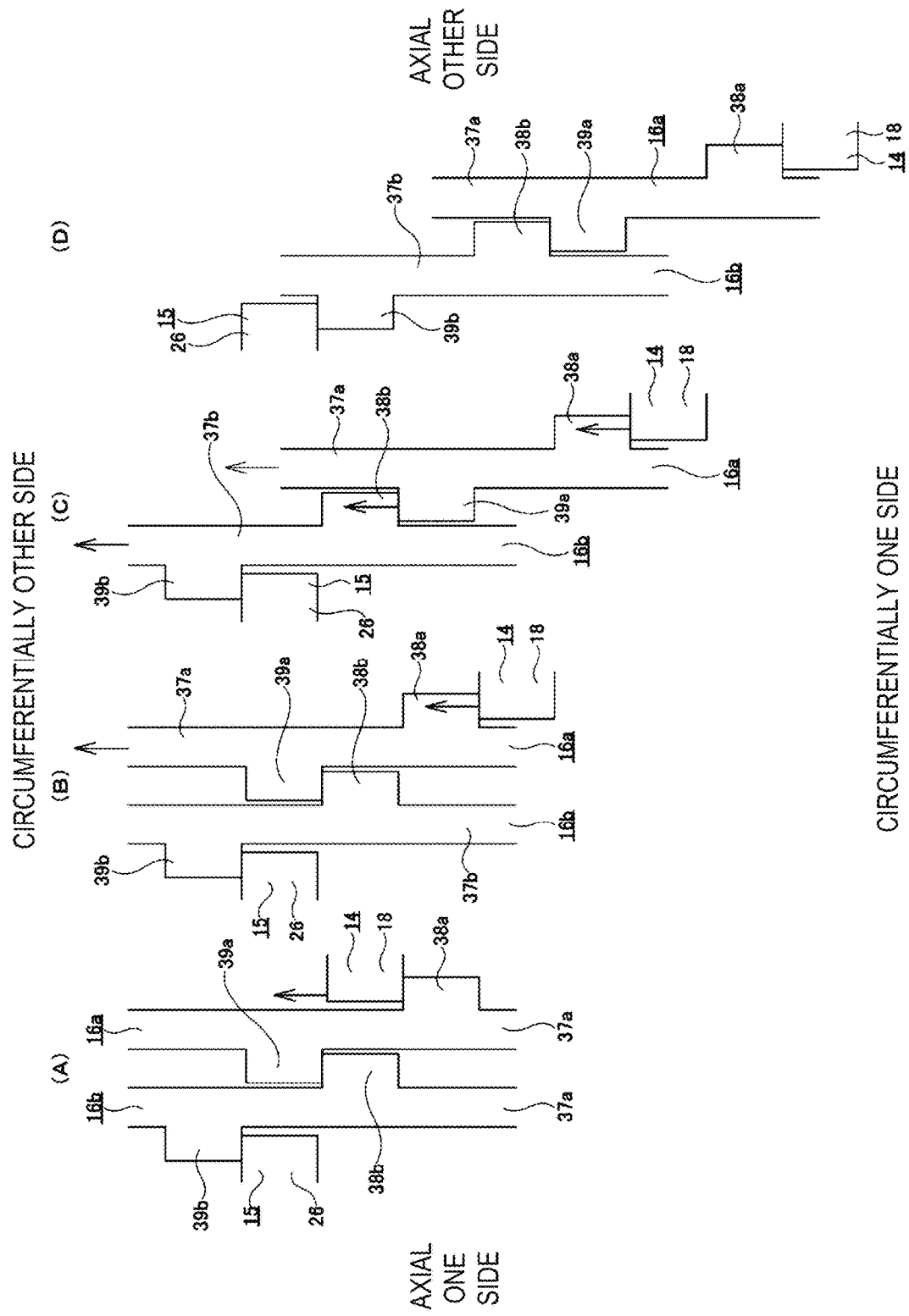
FIG. 7 (A) to (D) of FIG. 7 are schematic views illustrating an operation of a rotation limiting device when a steering wheel is operated from fully left to fully right according to the modification.

In the steering unit 3 (see FIG. 1) including the rotation limiting device 4a according to the present modification, when the steering wheel 2 is operated from fully left to fully right, the rotation limiting device 4a operates as shown in the order of (A) of FIG. 7→(B) of FIG. 7→(C) of FIG. 7→(D) of FIG. 7.

In a state in which the steering wheel 2 is operated to fully left, as shown in (A) of FIG. 7, the circumferential one side surface of the first protrusion 18 is in contact with a circumferential other side surface of the intermediate side first protrusion 38a of the intermediate member 16a on the axial other side, a circumferential one side surface of the intermediate side second protrusion 39a of the intermediate member 16a on the axial other side is in contact with a circumferential other side surface of the intermediate side first protrusion 38b of the intermediate member 16b on the axial one side, and a circumferential one side surface of the intermediate side second protrusion 39b of the intermediate member 16b on the axial one side is in contact with the circumferential other side surface of the second protrusion 26.

From this state, when the steering wheel 2 is operated to the right and the steering shaft 9 is rotated in the clockwise direction, as shown by an arrow in (A) of FIG. 7, only the first member 14 rotates in the clockwise direction (toward the circumferential other side) while the circumferential one side surface of the intermediate side second protrusion 39a of the intermediate member 16a on the axial other side remains in contact with the circumferential other side surface of the intermediate side first protrusion 38b of the intermediate member 16b on the axial one side, and the circumferential one side surface of the intermediate side second protrusion 39b of the intermediate member 16b on the axial one side remains in contact with the circumferential other side surface of the second protrusion 26. When the first member 14 rotates in the clockwise direction by an angle smaller than 360 degrees by the sum of the circumferential width of the first protrusion 18 and a circumferential width of the intermediate side first protrusion 38a, as shown in (B) of FIG. 7, the circumferential other side surface of the first protrusion 18 comes into contact with a circumferential one side surface of the intermediate side first protrusion 38a of the intermediate member 16a on the axial other side.

When the steering wheel 2 is further operated to the right from the state shown in (B) of FIG. 7, as indicated by an arrow in (B) of FIG. 7, the circumferential one side surface of the intermediate side first protrusion 38a of the intermediate member 16a on the axial other side is pressed toward the circumferential other side by the circumferential other side surface of the first protrusion 18. As a result, with the circumferential one side surface of the intermediate side second protrusion 39b of the intermediate member 16b on the axial one side remaining in contact with the circumferential other side surface of the second protrusion 26, the first member 14 and the intermediate member 16a on the axial other side rotate in the clockwise direction (toward the circumferential other side) integrally. Then, when the first member 14 and the intermediate member 16a on the axial other side rotate in the clockwise direction by an angle that is smaller than 360 degrees by the sum of a circumferential width of the intermediate side second protrusion 39a of the intermediate member 16a on the axial other side and a circumferential width of the intermediate side first protrusion 38b of the intermediate member 16b on the axial one side, as illustrated in (C) of FIG. 7, a circumferential other side surface of the intermediate side second protrusion 39a of the intermediate member 16a on the axial other side comes into contact with a circumferential one side surface of the intermediate side first protrusion 38b of the intermediate member 16b on the axial one side.

When the first member 14 and the intermediate member 16a on the axial other side integrally rotate in the clockwise direction by operating the steering wheel 2 further to the right from the state shown in (C) of FIG. 7, as shown by an arrow in (C) of FIG. 7, the circumferential one side surface of the intermediate side first protrusion 38b of the intermediate member 16b on the axial one side is pressed toward the circumferential other side by the circumferential other side surface of the intermediate side second protrusion 39a of the intermediate member 16a on the axial other side. As a result, the first member 14 and the two intermediate members 16a and 16b rotate together in the clockwise direction (toward the circumferential other side). Then, when the first member 14 and the two intermediate members 16a and 16b rotate in the clockwise direction by an angle that is smaller than 360 degrees by the sum of a circumferential width of the intermediate side second protrusion 39b of the intermediate member 16b on the axial one side and the circumferential width of the second protrusion 26, as shown in (D) of FIG. 7, a circumferential other side surface of the intermediate side second protrusion 39b of the intermediate member 16b on the axial one side comes into contact with the circumferential one side surface of the second protrusion 26. As a result, the intermediate member 16b on the axial one side is prevented from rotating further in the clockwise direction with respect to the second member 15. When the intermediate member 16b on the axial one side is prevented from rotating in the clockwise direction, the intermediate member 16a on the axial other side is prevented from rotating further in the clockwise direction. When the intermediate member 16a on the axial other side is prevented from rotating in the clockwise direction, the first member 14 is prevented from rotating further in the clockwise direction, and the steering shaft 9 and the steering wheel 2 supported and fixed to the steering shaft 9 are prevented from rotating further in the clockwise direction.

On the other hand, when the steering wheel 2 is operated from fully right to fully left, the rotation limiting device 4a operates as shown in the order of (A) of FIG. 8, (B) of FIG. 8, (C) of FIG. 8, and (D) of FIG. 8.

That is, in a state in which the steering wheel 2 is operated to fully right, as shown in (A) of FIG. 8, the circumferential other side surface of the first protrusion 18 is in contact with a circumferential one side surface of the intermediate side first protrusion 38a of the intermediate member 16a on the axial other side, a circumferential other side surface of the intermediate side second protrusion 39a of the intermediate member 16a on the axial other side is in contact with a circumferential one side surface of the intermediate side first protrusion 38b of the intermediate member 16b on the axial one side, and a circumferential other side surface of the intermediate side second protrusion 39b of the intermediate member 16b on the axial one side is in contact with the circumferential one side surface of the second protrusion 26.

From this state, when the steering wheel 2 is operated to the left and the steering shaft 9 is rotated in the counterclockwise direction, as shown by an arrow in (A) of FIG. 8, only the first member 14 rotates in the counterclockwise direction (toward the circumferential one side) while the circumferential other side surface of the intermediate side second protrusion 39a of the intermediate member 16a on the axial other side remains in contact with the circumferential one side surface of the intermediate side first protrusion 38b of the intermediate member 16b on the axial one side, and the circumferential other side surface of the intermediate side second protrusion 39b of the intermediate member 16b on the axial one side remains in contact with the circumferential one side surface of the second protrusion 26. When the first member 14 rotates in the counterclockwise direction by an angle smaller than 360 degrees by the sum of the circumferential width of the first protrusion 18 and a circumferential width of the intermediate side first protrusion 38a, as shown in (B) of FIG. 8, the circumferential one side surface of the first protrusion 18 comes into contact with a circumferential other side surface of the intermediate side first protrusion 38a of the intermediate member 16a on the axial other side.

When the steering wheel 2 is further operated to the left from the state shown in (B) of FIG. 8, as indicated by an arrow in (B) of FIG. 8, the circumferential other side surface of the intermediate side first protrusion 38a of the intermediate member 16a on the axial other side is pressed toward the circumferential one side by the circumferential one side surface of the first protrusion 18. As a result, with the circumferential other side surface of the intermediate side second protrusion 39b of the intermediate member 16b on the axial one side remaining in contact with the circumferential one side surface of the second protrusion 26, the first member 14 and the intermediate member 16a on the axial other side rotate in the counterclockwise direction (toward the circumferential one side) integrally. Then, when the first member 14 and the intermediate member 16a on the axial other side rotate in the counterclockwise direction by an angle that is smaller than 360 degrees by the sum of a circumferential width of the intermediate side second protrusion 39a of the intermediate member 16a on the axial other side and a circumferential width of the intermediate side first protrusion 38b of the intermediate member 16b on the axial one side, as illustrated in (C) of FIG. 8, a circumferential one side surface of the intermediate side second protrusion 39a of the intermediate member 16a on the axial other side comes into contact with a circumferential other side surface of the intermediate side first protrusion 38b of the intermediate member 16b on the axial one side.

When the first member 14 and the intermediate member 16a on the axial other side integrally rotate in the counterclockwise direction by operating the steering wheel 2 further to the left from the state shown in (C) of FIG. 8, as shown by an arrow in (C) of FIG. 8, the circumferential other side surface of the intermediate side first protrusion 38b of the intermediate member 16b on the axial one side is pressed toward the circumferential one side by the circumferential one side surface of the intermediate side second protrusion 39a of the intermediate member 16a on the axial other side. As a result, the first member 14 and the two intermediate members 16a and 16b rotate together in the counterclockwise direction (toward the circumferential one side). Then, when the first member 14 and the two intermediate members 16a and 16b rotate in the counterclockwise direction by an angle that is smaller than 360 degrees by the sum of a circumferential width of the intermediate side second protrusion 39b of the intermediate member 16b on the axial one side and the circumferential width of the second protrusion 26, as shown in (D) of FIG. 8, a circumferential one side surface of the intermediate side second protrusion 39b of the intermediate member 16b on the axial one side comes into contact with the circumferential other side surface of the second protrusion 26. As a result, the intermediate member 16b on the axial one side is prevented from rotating further in the counterclockwise direction with respect to the second member 15. When the intermediate member 16b on the axial one side is prevented from rotating in the counterclockwise direction, the intermediate member 16a on the axial other side is prevented from rotating further in the counterclockwise direction. When the intermediate member 16a on the axial other side is prevented from rotating in the counterclockwise direction, the first member 14 is prevented from rotating further in the counterclockwise direction, and the steering shaft 9 and the steering wheel 2 supported and fixed to the steering shaft 9 are prevented from rotating further in the counterclockwise direction.

In this modification, the intermediate member 16a on the axial one side and/or the intermediate member 16b on the axial other side may also be rotated together with the first member 14 due to a friction force acting between the outer peripheral surface of the first cylindrical portion 19 of the first member 14 and an inner peripheral surface of the side plate portion 37a of the intermediate member 16a on the axial other side and/or an inner peripheral surface of the side plate portion 37b of the intermediate member 16b on the axial one side. In this case, an operation order of the rotation limiting device 4a may be different from the example shown in FIGS. 7 and 8.

As described above, the rotation limiting device 4 (4a) according to the present example can increase the rotatable amount of the steering shaft 9 by increasing the number of the intermediate members 16 (16a, 16b) having the intermediate side first protrusions 38 (38a, 38b) protruding toward the axial other side and the intermediate side second protrusions 39 (39a, 39b) protruding toward the axial one side, and arranging the intermediate members 16 (16a, 16b) in series in the axial direction. Specifically, when the circumferential width W of the first protrusion 18, the second protrusion 26, the intermediate side first protrusion 38 (38a, 38b), and the intermediate side second protrusion 39 (39a, 39b) are all the same, each time one intermediate member 16 is added, the rotatable amount of the steering shaft 9 can be increased by an angle that is smaller than 360 degrees by twice the circumferential width W (2W).

In the case where the circumferential width W is 45 degrees, each time one intermediate member 16 (16a, 16b) is added, the rotatable amount of the steering shaft 9 can be increased by 270 degrees, and the number of lock-to-lock turns of the steering wheel 2 can be increased by 0.75. For example, as in the first example of the embodiment, in the rotation limiting device 4 including only one intermediate member 16, the rotatable amount of the steering shaft 9 is 540 degrees (the number of lock-to-lock turns of the steering wheel 2 is 1.5), while in the modification, in the rotation limiting device 4a having the two intermediate members 16a and 16b, the rotatable amount of the steering shaft 9 can be set to 810 degrees (the number of lock-to-lock turns of the steering wheel 2 is 2.25).

The rotation limiting device 4a of the present modification includes the gap adjusting members 48 at a portion between the first member 14 and the intermediate member 16a on the axial one side, a portion between the intermediate member 16a on the axial one side and the intermediate member 16b on the axial other side, and a portion between the intermediate member 16b on the axial other side and the second member 15, respectively. Therefore, it is possible to prevent rattling of the intermediate members 16a and 16b with respect to the first member 14 and the second member 15 in the axial direction, and to prevent the rotational resistance between the first member 14 and the intermediate member 16a on the axial other side, the rotational resistance between the intermediate member 16a on the axial other side and the intermediate member 16b on the axial one side, and the rotational resistance between the intermediate member 16b on the axial one side and the second member 15 from becoming unnecessarily large.

Some or all of the gap adjusting members may be a preload applying member that exhibits elasticity in the axial direction. The preload applying member may be, for example, a disc spring disposed between a pair of resin washers. When the preload applying member is disposed between the second flange portion and the side plate portion, the preload applying member may be implemented by disposing a disc spring between a metal washer on the axial one side and a resin washer on the axial other side. As a result, it is possible to prevent the rotational resistance between the first member and the second member and the intermediate member from becoming unnecessarily large, while providing the function of applying a preload between the first member and the second member.

Further, in the rotation limiting device 4a according to the present modification, the two intermediate members 16a and 16b have the same shape. That is, in the rotation limiting device according to the present disclosure, the rotatable amount of the rotation member can be adjusted by increasing or decreasing the number of intermediate members having the same shape. Therefore, according to the rotation limiting device of the present disclosure, it is possible to prevent an unnecessary increase in the manufacturing cost and the management cost of the parts and the assembling cost, and to suppress an increase in the manufacturing cost of the rotation limiting device.

Further, according to the rotation limiting device 4 of the present example, it is not necessary to increase the coupling strength of the first member 14 with respect to the steering shaft 9 in the axial direction and the coupling strength of the second member 15 with respect to the steering column 8 in the axial direction.

Figure 14:
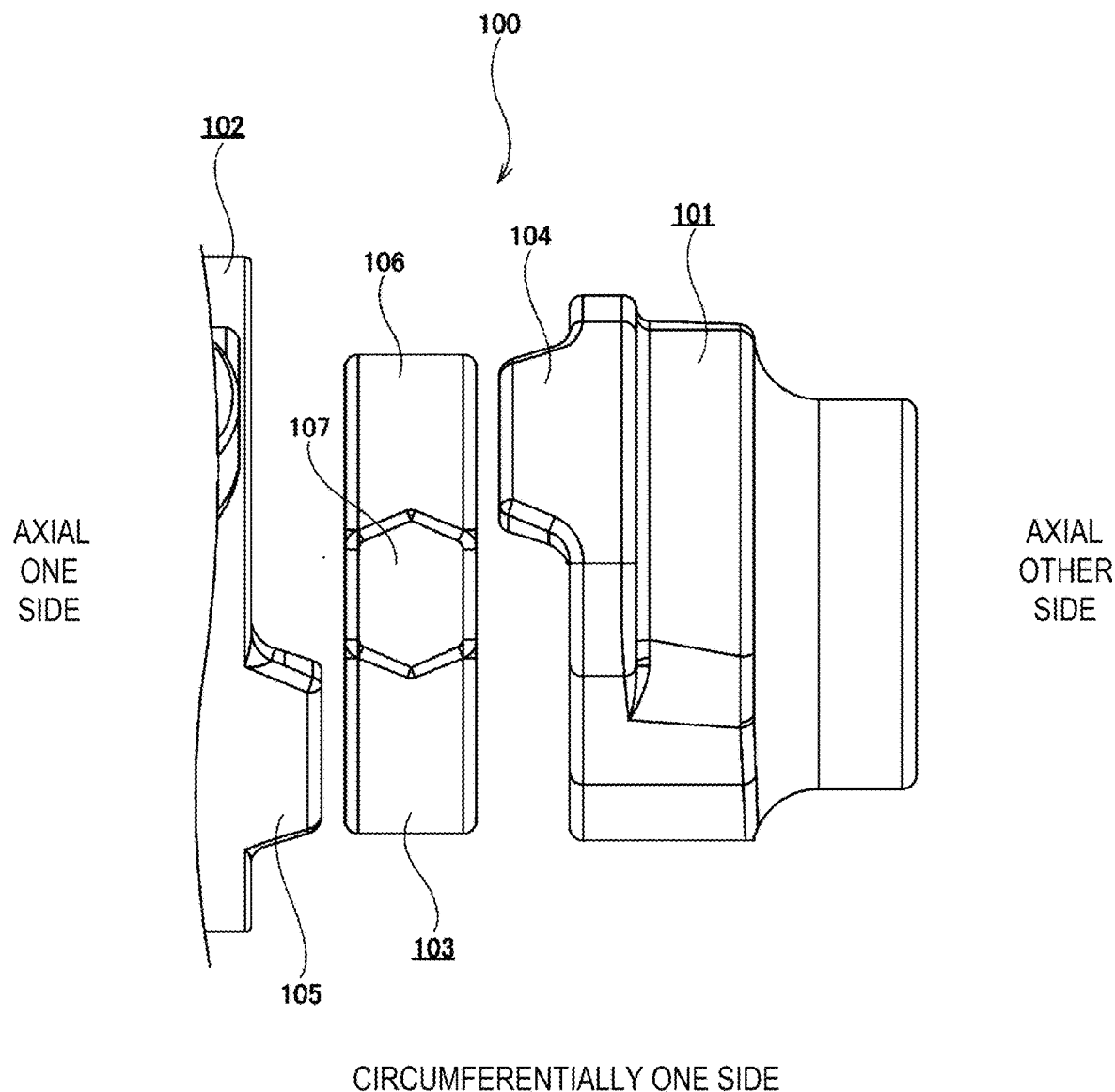
FIG. 14 is an exploded view showing a stopper unit in the related art.

That is, in the stopper unit 100 of a related-art structure according to the Patent Literature 1 shown in FIG. 14, side surfaces of the first rotation protrusion 104 on both sides in the circumferential direction, side surfaces of the fixing protrusion 105 on both sides in the circumferential direction, and side surfaces of the second rotation protrusion 107 on both sides in the circumferential direction are inclined with respect to the axial direction when viewed from the radially outer side. Therefore, when the first rotation member 101 rotates, a force is applied between the first rotation member 101 and the second rotation member 103 and/or between the second rotation member 103 and the housing 102 in a direction in which they are moved away from each other in the axial direction. Accordingly, it is necessary to sufficiently increase the coupling strength of the first rotation member 101 with respect to the steering shaft in the axial direction and the coupling strength of the housing 102 with respect to the vehicle body in the axial direction.

On the other hand, in the rotation limiting device 4 according to this example, the side surfaces of the first protrusion 18 on both sides in the circumferential direction, the side surfaces of the second protrusion 26 on both sides in the circumferential direction, the side surfaces of the intermediate side first protrusion 38 on both sides in the circumferential direction, and the side surfaces of the intermediate side second protrusion 39 on both sides in the circumferential direction extend linearly in the axial direction when viewed from the radial direction. Therefore, even when the first member 14 rotates as the steering shaft 9 rotates, no force acts in the axial direction between the first member 14 and the intermediate member 16 and between the intermediate member 16 and the second member 15. Therefore, it is not necessary to increase the coupling strength of the first member 14 with respect to the steering shaft 9 in the axial direction and the coupling strength of the second member 15 with respect to the steering column 8 in the axial direction, and it is possible to prevent the manufacturing cost of the steering device 1 including the rotation limiting device 4 from increasing unnecessarily.

In the rotation limiting device 4 according to this example, the radial rolling bearing 41 of the rotation support mechanism 17 is implemented by a ball bearing that uses balls as a plurality of rolling elements 45. In the case of implementing the present disclosure, the radial rolling bearing may be a radial roller bearing using rollers as rolling elements, or a radial needle bearing using needles as rolling elements.

Further, in this example, the inner ring 43 of the radial rolling bearing 41 is prevented from being displaced toward the axial one side by the retaining ring 42a locked to the inner diameter side locking groove 24 provided in the small diameter cylindrical surface portion 22 of the first member 14. That is, the inner ring 43 is sandwiched in the axial direction between the retaining ring 42a and the inner diameter side stepped surface 23 provided on an outer peripheral surface of the first member 14, and is positioned in the axial direction. In the case of implementing the present disclosure, it is also possible to prevent displacement toward the axial one side by externally fitting the inner ring of the radial rolling bearing to the first member by press fitting.

The outer ring 44 of the radial rolling bearing 41 is prevented from being displaced toward the axial one side by the retaining ring 42b locked to the outer diameter side locking groove 33 provided in the inner peripheral surface of the small diameter cylindrical portion 30 of the second member 15. That is, the outer ring 44 is sandwiched in the axial direction between the retaining ring 42b and the outer diameter side stepped surface 32 provided on the inner peripheral surface of the second member 15, and is positioned in the axial direction. In the case of implementing the present disclosure, it is also possible to prevent displacement toward the axial one side by fitting the outer ring of the radial rolling bearing into the second member by press fitting.

Alternatively, the rotation support mechanism may include a radial sliding bearing (bush) instead of the radial rolling bearing. In this case, a radially inner side portion of the radial sliding bearing is sandwiched in the axial direction between an inner diameter side stepped surface provided on the outer peripheral surface of the first member and a retaining ring locked to the outer peripheral surface, and a radially outer side portion of the radial sliding bearing is sandwiched in the axial direction between an outer diameter side stepped surface provided on the inner peripheral surface of the second member and a retaining ring locked to the inner peripheral surface.

In this example, the circumferential width of the first protrusion 18, the circumferential width of the second protrusion 26, the circumferential width of the intermediate side first protrusion 38, and the circumferential width of the intermediate side second protrusion 39 are all 45 degrees. When implementing the present disclosure, the circumferential width of the first protrusion, the circumferential width of the second protrusion, the circumferential width of the intermediate side first protrusion, and the circumferential width of the intermediate side second protrusion are not particularly limited and may be set freely. However, if the circumferential width is excessively small, the strength of the protrusions cannot be sufficiently ensured. On the other hand, if the circumferential width is excessively large, the rotatable amount of the rotation member becomes excessively small. Taking these into consideration, the circumferential width of the first protrusion, the circumferential width of the second protrusion, the circumferential width of the intermediate side first protrusion, and the circumferential width of the intermediate side second protrusion may be set to 90 degrees or less, and preferably 30 degrees or more and 60 degrees or less.

When the circumferential width of the first protrusion, the circumferential width of the second protrusion, the circumferential width of the intermediate side first protrusion, and the circumferential width of the intermediate side second protrusion are all W [deg], and the number of the intermediate members is n, the rotatable amount $\alpha$ [deg] of the rotation member coupled and fixed to the first member 14 is $\alpha=(360-2W)(n+1)$. Therefore, when W is set to 90 degrees or less, preferably 30 degrees or more and 60 degrees or less, the number of lock-to-lock turns (about 1 to 4.167) of a steering wheel set in a typical automatic vehicle can be achieved with a minimum number of intermediate members (four or less).

Further, in the case of implementing the present disclosure, the circumferential width of the first protrusion, the circumferential width of the second protrusion, the circumferential width of the intermediate side first protrusion, and the circumferential width of the intermediate side second protrusion are not necessarily all the same, and some or all of them may be different.

In this example, the intermediate side first protrusion 38 and the intermediate side second protrusion 39 which are provided in the intermediate member 16 are out of phase with each other in the circumferential direction by 180 degrees. Therefore, the center of gravity of the intermediate member 16 can be positioned on the central axis O of the intermediate member 16. Therefore, even when no torque is applied to the steering shaft 9, it is possible to prevent the intermediate member 16 from rotating due to the action of gravity. In the case of implementing the present disclosure, the phases of the intermediate side first protrusion and the intermediate side second protrusion in the circumferential direction can be freely set. Specifically, for example, as shown in the fourth example of the embodiment shown in FIGS. 12 and 13 to be described later, the phases of the intermediate side first protrusion and the intermediate side second protrusion in the circumferential direction may be made to match with each other, or the intermediate side first protrusion and the intermediate side second protrusion may be arranged to be out of phase with each other by 90 degrees in the circumferential direction.

Further, in this example, the first protrusion 18, the second protrusion 26, the intermediate side first protrusion 38, and the intermediate side second protrusion 39 all have a sector-shaped end surface when viewed from the axial direction. Therefore, a contact area between the first protrusion 18 and the intermediate side first protrusion 38 and a contact area between the second protrusion 26 and the intermediate side second protrusion 39 are increased, and the contact surface pressure can be kept low. On the other hand, Patent Literature 2 does not describe or suggest specific shapes of engaging pieces 13a to 16a and 14b to 17b.

In this example, the first member 14 is coupled and fixed to the steering shaft 9 that rotates during use, and the second member 15 is coupled and fixed to the steering column 8 that does not rotate even during use. When implementing the present disclosure, the second member may be coupled and fixed to a rotation member that rotates during use, and the first member may be coupled and fixed to a fixed member that does not rotate even during use.

When implementing the present disclosure, materials for the first member, the second member, and the intermediate member are not particularly limited as long as they are capable of rotating (sliding) relative to each other, and may be made of, for example, a synthetic resin or a metal material. The first member, the second member, and the intermediate member constructed as a single unit or may be constructed by combining a plurality of components. When a member is constructed by combining a plurality of components, for example, a protrusion and a portion other than the protrusion may be made of different materials. If the first protrusion and the intermediate side first protrusion are made of different metal materials, adhesion between the first protrusion and the intermediate side first protrusion can be prevented. If the second protrusion and the intermediate side second protrusion are made of different metal materials, adhesion between the second protrusion and the intermediate side second protrusion can be prevented. Further, if the protrusion is made of a synthetic resin, collision noise can be reduced.

In terms of preventing adhesion and seizure of the first member, the second member, and the intermediate member, it is desirable to fill a cylindrical space between the outer peripheral surface of the first cylindrical portion of the first member and the inner peripheral surface of the second cylindrical portion of the second member with a lubricant such as grease. In this case, an oil seal may be provided between the first cylindrical portion of the first member, and the second flange portion and/or the second cylindrical portion of the second member.

In this example, the rotation limiting device 4 is incorporated in the steering unit 3 constituting the steer-by-wire type steering device 1. Alternatively, the rotation limiting device according to the present disclosure may be incorporated and used to limit a rotatable amount of a rotation member of any rotating machinery device including not only the steer-by-wire type steering device, but also a steering device in which a steering unit and a steered unit are mechanically connected.

Second Example of Embodiment

Figure 9:
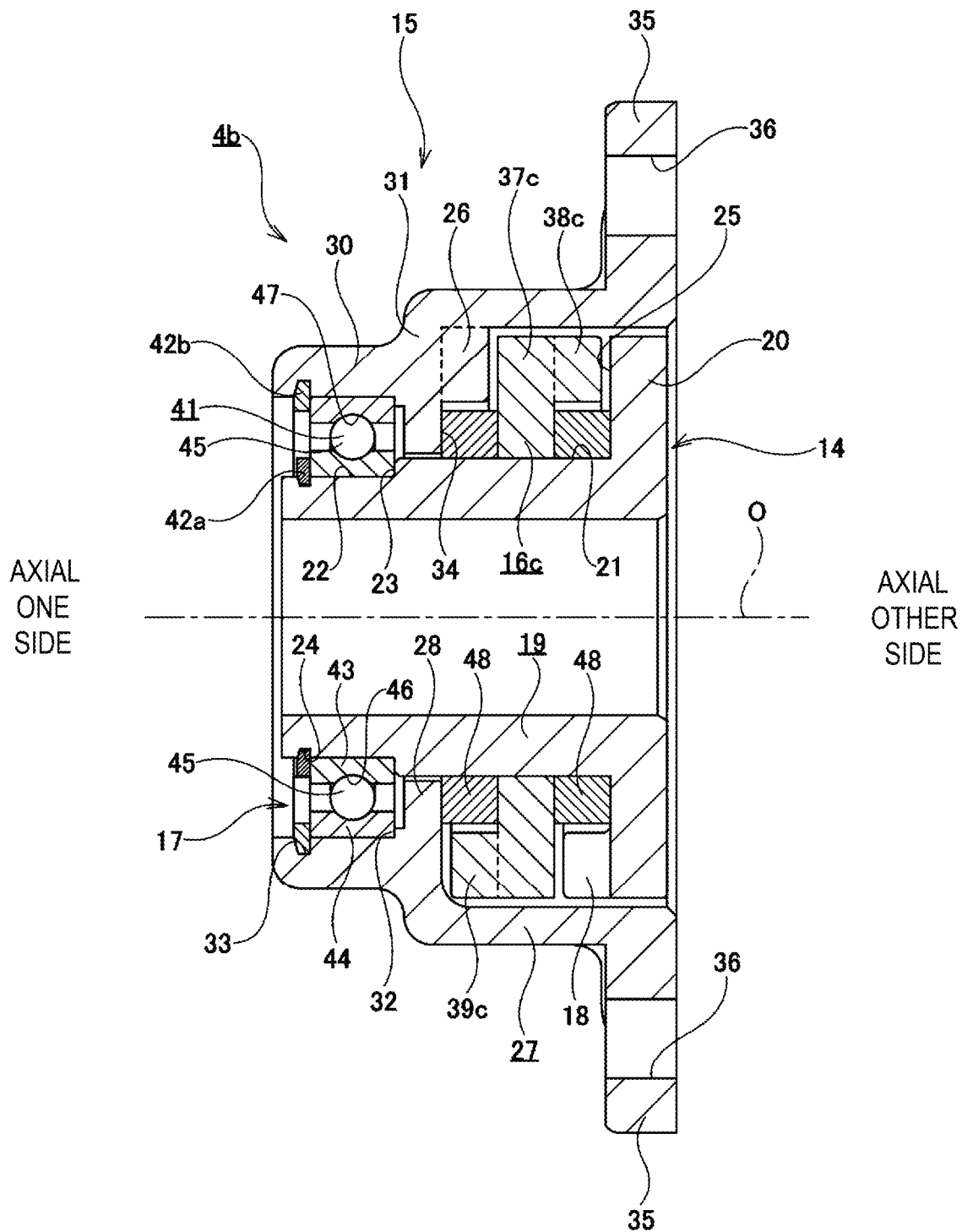
FIG. 9 is a cross-sectional view showing a rotation limiting device according to a second example of the embodiment of the present disclosure.

FIG. 9 shows a second example of the embodiment of the present disclosure. In a rotation limiting device 4b according to the present example, similarly to the modification of the first example of the embodiment, the intermediate member 16c includes: a side plate portion 37c having a hollow circular plate shape; an intermediate side first protrusion 38c protruding toward the axial other side from an axial other side surface of the side plate portions 37c at one position in the circumferential direction; and an intermediate side second protrusion 39c protruding toward the axial one side from an axial one side surface at one position radially opposite to the intermediate side first protrusion 38c. That is, the intermediate member 16c do not include the intermediate cylindrical portion 40 that is provided in the intermediate member 16 according to the first example of the embodiment.

The rotation limiting device 4b according to the present example includes two annular gap adjusting members 48. Of the two gap adjusting members 48, the gap adjusting member 48 on the axial other side is sandwiched in the axial direction between the radially inner side portion of the axial one side surface (the first side surface 25) of the first flange portion 20 of the first member 14 and a radially inner side portion of an axial other side surface of the side plate portion 37c. The gap adjusting member 48 on the axial one side is sandwiched in the axial direction between a radially inner side portion of an axial one side surface of the side plate portion 37c and the radially inner side portion of the axial other side surface (the second side surface 34) of the second flange portion 28 of the second member 15.

Each of the gap adjusting members 48 is formed of a spacer made of a material having a small friction coefficient with respect to the axial one side surface of the first flange portion 20 and the axial other side surface of the second flange portion 28, and/or the side plate portion 37c. Specifically, for example, each of the gap adjusting members 48 may be made of a resin washer, an oil-retaining metal, or the like.

According to the rotation limiting device 4b of the present example, it is possible to prevent the rotational resistance between the first member 14 and the intermediate member 16c and the rotational resistance between the second member 15 and the intermediate member 16c from becoming unnecessarily large, while suppressing the rattling of the intermediate member 16c with respect to the first member 14 and the second member 15 in the axial direction. Configu-
rations and operation effects of other parts are the same as those of the first example of the embodiment and the modification thereof.

Third Example of Embodiment

Figure 10:
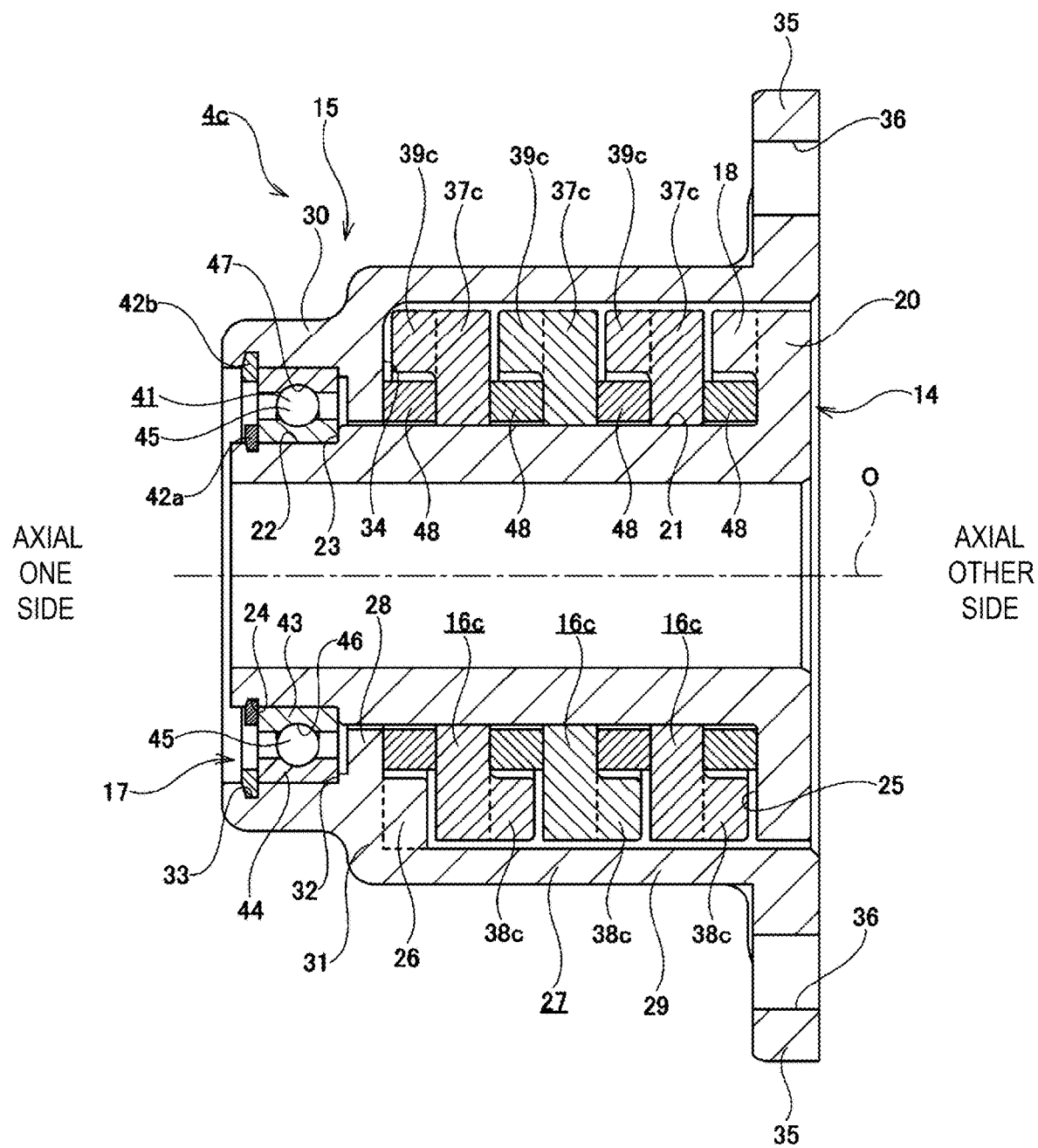
FIG. 10 is a cross-sectional view showing a rotation limiting device according to a third example of the embodiment of the present disclosure.
Figure 11:
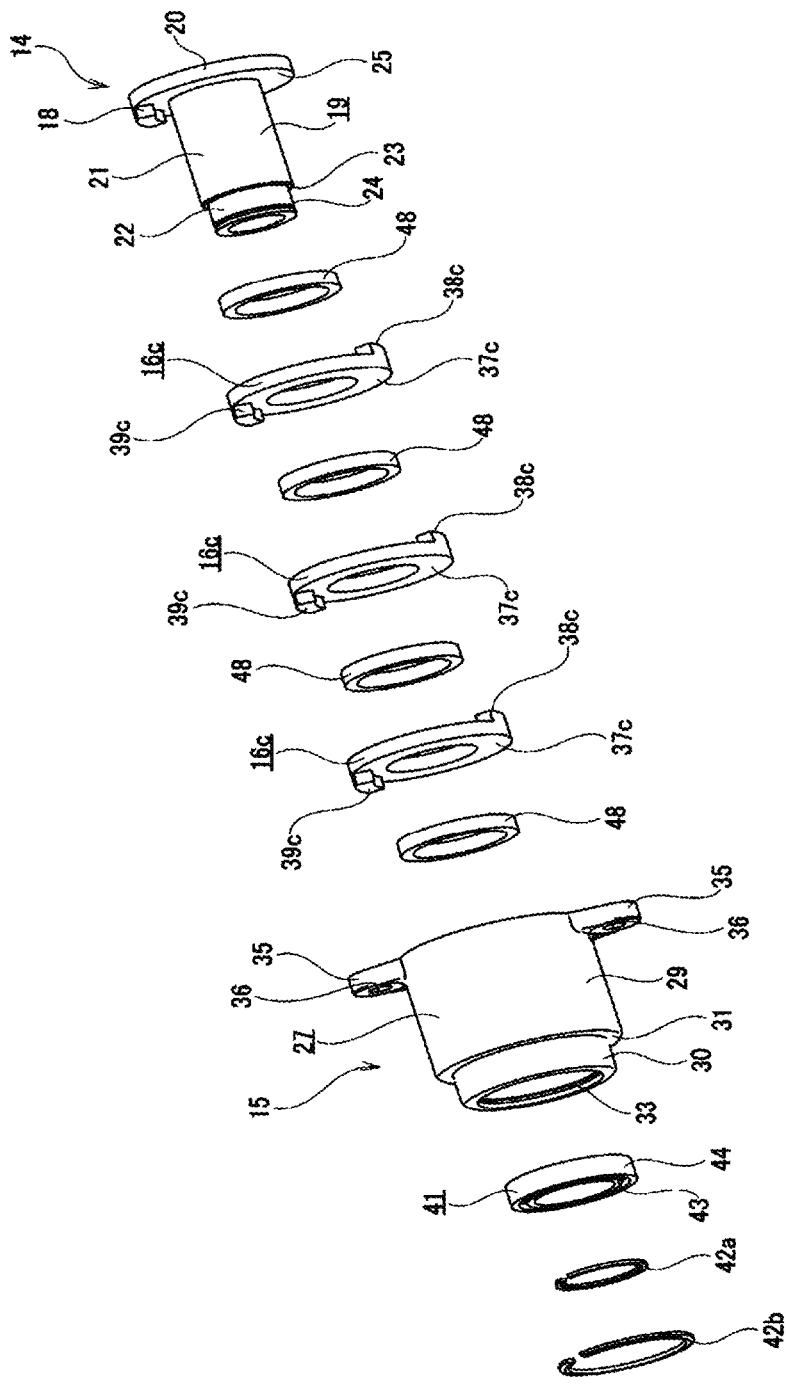
FIG. 11 is an exploded perspective view showing the rotation limiting device according to the third example of the embodiment of the present disclosure.

FIGS. 10 and 11 show a third example of the embodiment of the present disclosure. A rotation limiting device 4c according to the present example includes the first member 14, the second member 15, and three intermediate members 16c. All the intermediate members 16c have the same shape. In this example, each of the intermediate members 16c includes: the side plate portion 37c having a hollow circular plate shape; the intermediate side first protrusion 38c protruding toward the axial other side from an axial other side surface of the side plate portions 37c at one position in the circumferential direction; and the intermediate side second protrusion 39c protruding toward the axial one side from an axial one side surface at one position radially opposite to the intermediate side first protrusion 38c. The three intermediate members 16c are arranged in series in the axial direction and are externally fitted to the large diameter cylindrical surface portion 21 of the first cylindrical portion 19 of the first member 14 so as to be rotatable relative to each other. An axial length of the large diameter cylindrical surface portion 21 of the first cylindrical portion 19 and an axial length of the large diameter cylindrical portion 29 of the second cylindrical portion 27 are longer than that of the structure according to the second example of the embodiment by an amount of the two intermediate members 16c added.

Further, the rotation limiting device 4c according to the present example includes four gap adjusting members 48 in portions between the three intermediate members 16c, a portion between the intermediate member 16c on the axial other side and the first flange portion 20, and a portion between the intermediate member 16c on the axial one side and the second flange portion 28, respectively. As a result, rattling of the three intermediate members 16c with respect to the first member 14 and the second member 15 in the axial direction is prevented. Each of the gap adjusting members 48 is made of a material having a small friction coefficient with respect to the axial one side surface (first side surface 25) of the first flange portion 20 and the axial other side surface (second side surface 34) of the second flange portion 28, and/or the side plate portion 37c.

Since the rotation limiting device 4c according to the present example includes three intermediate members 16c, when the circumferential width of the first protrusion, the circumferential width of the second protrusion, the circumferential width of the intermediate side first protrusion, and the circumferential width of the intermediate side second protrusion are all 45 degrees, the rotatable amount of the steering shaft 9 (see FIG. 1) coupled and fixed to the first member 14 can be doubled as compared with the structure including only one intermediate member 16, such as in the rotation limiting device 4 according to the first example of the embodiment. Specifically, in the rotation limiting device 4c according to this example, when the circumferential width W of the first protrusion 18, the second protrusion 26, the intermediate side first protrusion 38c, and the intermediate side second protrusion 39c is all 45 degrees, the rotatable amount of the steering shaft 9 can be set to 1080 degrees.

In the rotation limiting device 4c according to this example, the three intermediate members 16c have the same shape. Therefore, it is possible to prevent an unnecessary increase in the manufacturing cost and the management cost of the parts and the assembling cost, and to suppress an increase in the manufacturing cost of the rotation limiting device 4c. Configurations and operation effects of other parts are the same as those of the first example and the modification thereof, and the second example of the embodiment.

Fourth Example of Embodiment

Figure 12:
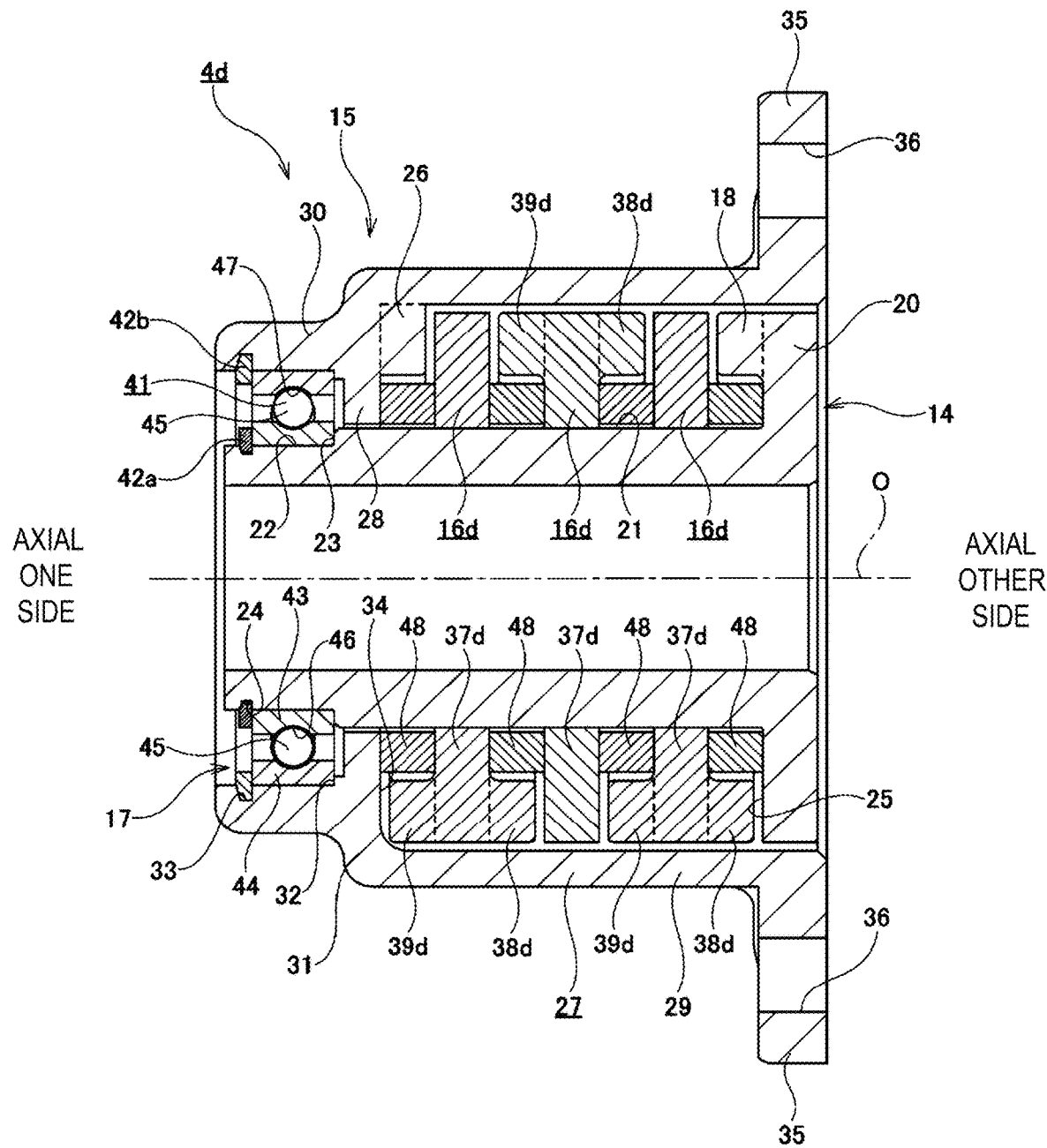
FIG. 12 is a cross-sectional view showing a rotation limiting device according to a fourth example of the embodiment of the present disclosure.
Figure 13:
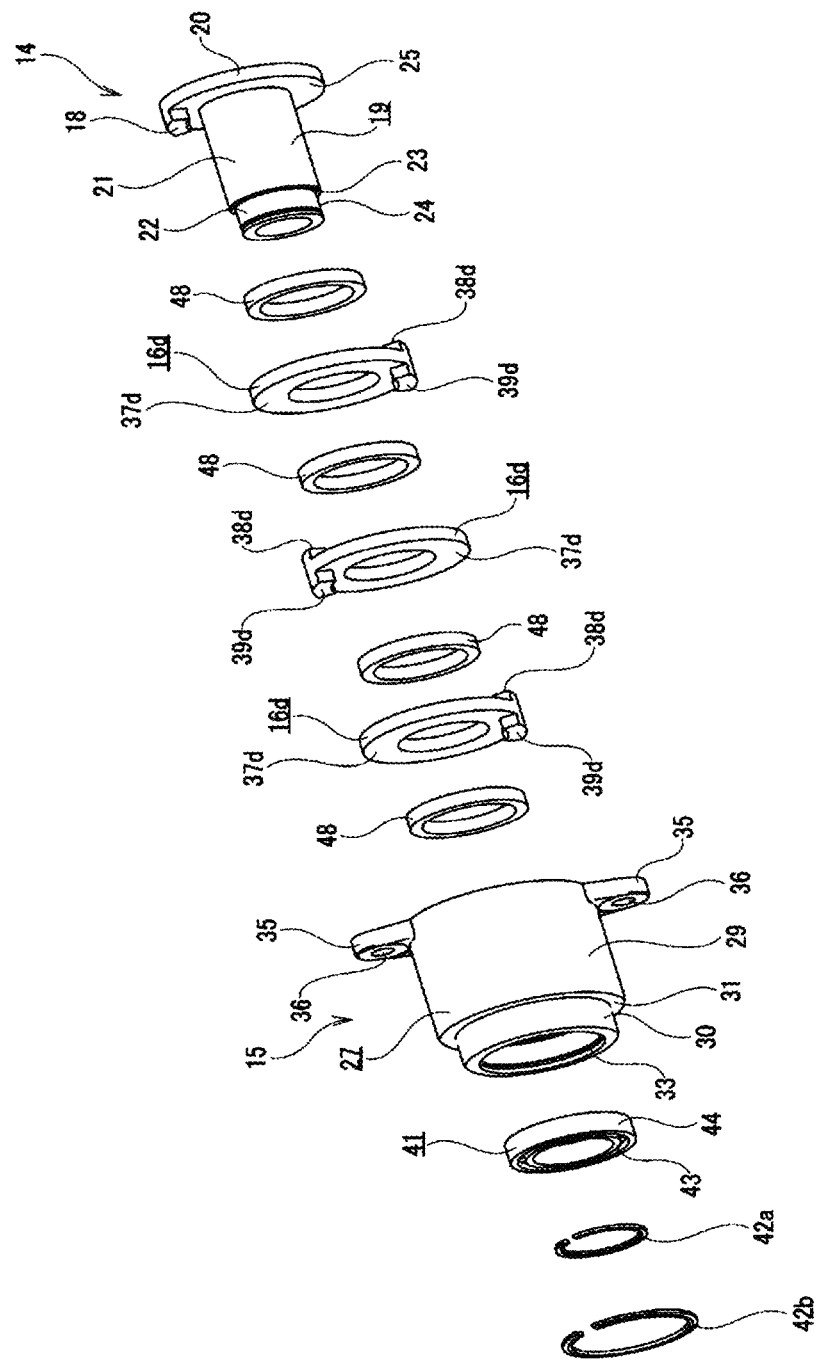
FIG. 13 is an exploded perspective view showing the rotation limiting device according to the fourth example of the embodiment of the present disclosure.

FIGS. 12 and 13 show a fourth example of the embodiment of the present disclosure. A rotation limiting device 4d according to the present example includes the first member 14, the second member 15, and three intermediate members 16d. All the intermediate members 16d have the same shape. In this example, each of the intermediate members 16d includes: a side plate portion 37d having a hollow circular plate shape; an intermediate side first protrusion 38d protruding toward the axial other side from an axial other side surface of the side plate portions 37d at one position in the circumferential direction; and an intermediate side second protrusion 39d protruding toward the axial one side from an axial one side surface at one position coincident with the intermediate side first protrusion 38d in phase with respect to the circumferential direction. The three intermediate members 16d are arranged in series in the axial direction and are externally fitted to the large diameter cylindrical surface portion 21 of the first cylindrical portion 19 of the first member 14 so as to be rotatable relative to each other.

According to the rotation limiting device 4d of this example, it is possible to prevent a large force from being applied to the side plate portions 37d of the respective intermediate members 16d in the circumferential direction.

That is, for example, as in the rotation limiting device 4c according to the third example of the embodiment, in a structure in which the phases of the intermediate side first protrusion 38c and the intermediate side second protrusion 39c in the circumferential direction are different by 180 degrees, a force in the circumferential direction applied from the first protrusion 18 to the intermediate side first protrusion 38c is transmitted in the circumferential direction through the side plate portion 37c, and is applied to the second protrusion 26 from the intermediate side second protrusion 39c. Therefore, since a large force may be applied to the side plate portion 37c in the circumferential direction, it is necessary to ensure that the side plate portion 37c has a sufficient strength.

On the other hand, in the rotation limiting device 4d according to this example, the phases of the intermediate side first protrusion 38d and the intermediate side second protrusion 39d in the circumferential direction are made to match with each other. Therefore, most of the force in the circumferential direction applied from the first protrusion 18 to the intermediate side first protrusion 38d is directly transmitted to the intermediate side second protrusion 39d without acting on the side plate portion 37d, and is then applied to the second protrusion 26 from the intermediate side second protrusion 39d. As a result, a large force can be prevented from acting on the side plate portion 37d in the circumferential direction. Therefore, a thickness of the side plate portion 37d in the axial direction can be reduced, the intermediate side first protrusion 38d and the intermediate side second protrusion 39d can be made of a metal material, and the side plate portion 37d can be made of a synthetic resin, which makes it easier to reduce the weight of the intermediate member 16d. Configurations and operation effects of other parts are the same as those of the first example and the modifications thereof, the second example, and the third example of the embodiment.

REFERENCE SIGNS LIST 1 steering device
2 steering wheel
3 steering unit
4, 4a, 4b, 4c, 4d rotation limiting device
5 steered wheel
6 steered unit
7 control unit
8 steering column
9 steering shaft
10 reaction force applying device
11 gear housing
12 steering actuator
13 tie rod
14 first member
15 second member
16, 16a, 16b, 16c, 16d intermediate member
17 rotation support mechanism
18 first protrusion
19 first cylindrical portion
20 first flange portion
21 large diameter cylindrical surface portion
22 small diameter cylindrical surface portion
23 inner diameter side stepped surface
24 inner diameter side locking groove
25 first side surface
26 second protrusion
27 second cylindrical portion
28 second flange portion
29 large diameter cylindrical portion
30 small diameter cylindrical portion
31 connecting plate portion
32 outer diameter side stepped surface
33 outer diameter side locking groove
34 second side surface
35 ear portion
36 coupling hole
37, 37a, 37b, 37c, 37d side plate portion
38, 38a, 38b, 38c, 38d intermediate side first protrusion
39, 39a, 39b, 39c, 39d intermediate side second protrusion
40 intermediate cylindrical portion
41 radial rolling bearing
42a, 42b retaining ring
43 inner ring
44 outer ring
45 rolling element
46 inner ring raceway
47 outer ring raceway
48 gap adjusting member
100 stopper unit
101 first rotation member
102 housing
103 second rotation member
104 first rotation protrusion
105 fixing protrusion
106 cylindrical portion
107 second rotation protrusion

The invention claimed is:

1. A rotation limiting device comprising:
a first member having a first protrusion;
a second member having a second protrusion disposed on an axial one side with respect to the first protrusion, the second member being disposed around the first member and configured to rotate relative to the first member;

at least one intermediate member disposed between the first member and the second member in a radial direction and supported in a relatively rotatable manner with respect to the first member and the second member, the at least one intermediate member including a side plate portion disposed between the first protrusion and the second protrusion in an axial direction, an intermediate side first protrusion protruding toward an axial other side from an axial other side surface of the side plate portion, and an intermediate side second protrusion protruding toward the axial one side from an axial one side surface of the side plate portion; and a rotation support mechanism configured to support the second member around the first member in a relatively rotatable manner with respect to the first member, wherein the first member has a first side surface facing the axial one side and the first protrusion protruding from the first side surface toward the axial one side, wherein the second member has a second side surface facing the axial other side and the second protrusion protruding from the second side surface toward the axial other side, wherein the first member includes a first cylindrical portion, extending toward the axial one side, to which the at least one intermediate member is externally fitted in a relatively rotatable manner, and a first flange portion that protrudes toward a radially outer side from an outer peripheral surface of the first cylindrical portion, wherein the first flange portion has the first side surface on an axial one side surface, and wherein the rotation support mechanism is disposed on the outer peripheral surface of the first cylindrical portion.

2. The rotation limiting device according to claim 1, wherein the second member includes a second cylindrical portion and a second flange portion protruding radially inward from an inner peripheral surface of the second cylindrical portion, and wherein the second flange portion has the second side surface on an axial other side surface.

3. The rotation limiting device according to claim 1, wherein the rotation support mechanism includes a radial rolling bearing having an inner ring externally fitted to the first member, an outer ring fitted into the second member, and a plurality of rolling elements rollably disposed between the inner ring and the outer ring.

4. A steering device comprising:

a steering shaft; and a rotation limiting device configured to limit a rotatable amount of the steering shaft to a predetermined value, wherein the rotation limiting device is implemented by the rotation limiting device according to claim 1, and wherein one member of the first member and the second member is coupled and fixed to the steering shaft, and the other member of the first member and the second member is supported and fixed to a portion that does not rotate even during use.

\* \* \* \* \*